(12) United States Patent
Yamamura et al.

(10) Patent No.: US 7,741,747 B2
(45) Date of Patent: Jun. 22, 2010

(54) ROTOR OF ROTATING ELECTRICAL MACHINE AND MANUFACTURING METHOD THERE FOR

(75) Inventors: Akihiro Yamamura, Chiyoda-ku (JP);
Yoshihito Asao, Chiyoda-ku (JP);
Satoru Akutsu, Chiyoda-ku (JP);
Kazuhisa Takashima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 83 days.

(21) Appl. No.: 12/055,105

(22) Filed: Mar. 25, 2008

(65) Prior Publication Data
US 2009/0102304 A1    Apr. 23, 2009

(30) Foreign Application Priority Data
Oct. 23, 2007    (JP)    ............... 2007-275236

(51) Int. Cl.
*H02K 21/12*    (2006.01)
(52) U.S. Cl. .................... 310/156.28; 310/156.01
(58) Field of Classification Search ................. 310/156.01–156.84, 261, 262
See application file for complete search history.

(56) References Cited
U.S. PATENT DOCUMENTS

| 4,742,259 | A | * | 5/1988 | Schaefer et al. | ........ | 310/156.28 |
| 4,855,630 | A | * | 8/1989 | Cole | ........ | 310/156.28 |
| 4,973,872 | A | * | 11/1990 | Dohogne | ........ | 310/156.28 |
| 5,140,210 | A | * | 8/1992 | Shirakawa | ........ | 310/156.28 |
| 6,750,580 | B2 | * | 6/2004 | Lai et al. | ........ | 310/156.28 |
| 2003/0011264 | A1 | * | 1/2003 | Du | ........ | 310/156.08 |

FOREIGN PATENT DOCUMENTS

| JP | 55-120285 U | 8/1980 |
| JP | 2001-25193 A | 1/2001 |
| JP | 2003299279 | 10/2003 |
| JP | 2004343817 | 12/2004 |
| KR | 20070023076 | 2/2007 |

* cited by examiner

*Primary Examiner*—Ngyuen N Hanh
(74) *Attorney, Agent, or Firm*—Sughrue Mion, PLLC

(57) ABSTRACT

A rotor of a rotating electrical machine is provided in which neither deterioration nor fluctuation in the cogging torque is caused and that causes neither physical enlargement nor cost increase. The rotor of a rotating electrical machine, provided with a plurality of magnetic poles 3 that are fixed on a rotor iron core 2 and arranged spaced apart from one another in the circumferential direction of the rotor iron core 2, is characterized by including a tube-shaped non-magnetic ring 4 mounted on the outer circumferential surfaces of the plurality of magnetic poles 3, and characterized in that the non-magnetic ring has a plurality of inner-diameter bulging portions 41 that abut on the corresponding outer circumferential surfaces of the plurality of magnetic poles.

11 Claims, 17 Drawing Sheets

ROTOR OF ROTATING ELECTRICAL MACHINE AND MANUFACTURING METHOD THERE FOR

BACKGROUND OF THE INVENTION

1. Field of the Invention

The present invention relates to a rotor, having a plurality of magnetic poles, of a rotating electrical machine and to a manufacturing method for the rotor.

2. Description of the Related Art

With regard to a rotor, of a rotating electrical machine, having a plurality of permanent magnets on the circumferential surface of a laminated iron core fixed on the circumferential surface of the rotor shaft, a configuration has already been proposed in which both axis-direction ends of each of the permanent magnets are covered with a cover of a non-magnetic material (e.g., refer to Patent Document 1.).

In the conventional rotor of a rotating electrical machine, hereinafter) disclosed in Patent Document 1, the non-magnetic cover provided on the rotor is fixed on the permanent magnet, by means of an adhesive. With the conventional rotor of a rotating electrical machine configured in this manner, the position, in the circumferential direction of the rotor, of the permanent magnet can securely be fixed, by fixing the laminated iron core and the permanent magnet to each other and by fixing the permanent magnet and the cover to each other.

In addition, as another conventional rotor of a rotating electrical machine, a configuration has already been disclosed in which permanent magnets are arranged on the circumferential surface of a yoke, the outer surfaces of the permanent magnets are covered with a fastening ring of a non-magnetic material, and the fastening ring is pressed and fixed by a fixation member such as a bolt to the yoke, in a direction from the circumference to the radial inside of the yoke (e.g., refer to Patent Document 2).

With the conventional rotor of a rotating electrical machine disclosed in Patent Document 2, the fastening ring is pressed into the yoke from the circumference of the yoke and binding force is exerted on the permanent magnet, so that the position, in the circumferential direction, of the permanent magnet is secured.

[Patent Document 1] Japanese Patent Laid-Open No. 2001-25193

[Patent Document 2] Japanese utility model Laid-Open No. S55-120285

In the case of the conventional rotor of a rotating electrical machine disclosed in Patent Document 1, while the adhesive hardens or when the adhesive does not have sufficient fixing power, the position, in the circumferential direction, of the permanent magnet cannot securely be fixed. The position, in the circumferential direction, of the permanent magnet considerably affect the cogging torque of the rotating electrical machine; therefore, there has been a problem that, in the case where the position, in the circumferential direction, of the permanent magnet cannot be fixed at a predetermined position, deterioration or fluctuation in the cogging torque is caused, whereby vibration or noise occurs in the rotating electrical machine.

Moreover, in the case of the conventional rotor of a rotating electrical machine disclosed in Patent Document 2, a fixation member, such as a bolt, for fixing the fastening ring is required; therefore, the increase in material costs, processing costs and the like is caused. Still moreover, it is required to make the space between the permanent magnets larger than the size of the fixation member; thus, the torque is deteriorated unless the physical constitution of the rotating electrical machine is changed. Furthermore, compensation of the torque deterioration causes the physical enlargement of the rotating electrical machine, for example, the extension of the shaft of the rotating electrical machine.

SUMMARY OF THE INVENTION

The present invention has been implemented in order to solve the foregoing problems in the conventional rotor of a rotating electrical machines; the objective of the present invention is to provide a rotor of a rotating electrical machine in which neither deterioration nor fluctuation in the cogging torque is caused and that causes neither physical enlargement nor cost increase.

Moreover, the objective of the present invention is to provide a manufacturing method that makes it possible to readily manufacture, without causing cost increase, a rotor of a rotating electrical machine in which neither deterioration nor fluctuation in the cogging torque is caused.

A rotor of a rotating electrical machine according to the present invention, provided with a plurality of magnetic poles that are fixed on a rotor iron core and arranged spaced apart from one another in the circumferential direction of the rotor iron core, is characterized by including a tube-shaped non-magnetic ring mounted on outer circumferential surfaces of the plurality of magnetic poles, and characterized in that the non-magnetic ring has a plurality of inner-diameter bulging portions that abut on the corresponding outer circumferential surfaces of the plurality of magnetic poles.

A manufacturing method, according to the present invention, for a rotor of a rotating electrical machine provided with a plurality of magnetic poles that are fixed on a rotor iron core and arranged spaced apart from one another in the circumferential direction of the rotor iron core and a non-magnetic ring having a plurality of inner-diameter bulging portions that abut on the corresponding outer circumferential surfaces of the plurality of magnetic poles, is characterized by including the steps of mounting a tube-shaped non-magnetic ring having a plurality of inner-diameter bulging portions on outer circumferential surfaces of the plurality of magnetic poles and forming a radial-direction extending portion, at least one of the axis-direction end portions of the mounted non-magnetic ring, which extends inward in the radial direction of the non-magnetic ring.

A manufacturing method, according to the present invention, for a rotor of a rotating electrical machine provided with a plurality of magnetic poles that are fixed on a rotor iron core and arranged spaced apart from one another in the circumferential direction of the rotor iron core and a non-magnetic ring having a plurality of inner-diameter bulging portions that abut on the corresponding outer circumferential surfaces of the plurality of magnetic poles, is characterized by including the steps of press-fitting an approximately cylindrical non-magnetic ring on outer circumferential surfaces of the plurality of magnetic poles and forming a radial-direction extending portion, at least one of the axis-direction end portions of the press-fitted non-magnetic ring, which extends inward in the radial direction of the non-magnetic ring, and characterized in that the approximately cylindrical non-magnetic ring is deformed due to the press-fitting, so that the plurality of inner-diameter bulging portions of the non-magnetic ring are formed.

A manufacturing method, according to the present invention, for a rotor of a rotating electrical machine provided with a plurality of magnetic poles that are fixed on a rotor iron core and arranged spaced apart from one another in the circumferential direction of the rotor iron core and a non-magnetic ring having a plurality of inner-diameter bulging portions that abut on the corresponding outer circumferential surfaces of the plurality of magnetic poles, is characterized by including the steps of shrinkage-fitting an approximately cylindrical non-magnetic ring on outer circumferential surfaces of the plurality of magnetic poles and forming a radial-direction extending portion, at least one of the axis-direction end portions of the shrinkage-fitted non-magnetic ring, which extends inward in the radial direction of the non-magnetic ring, and characterized in that the approximately cylindrical non-magnetic ring is deformed due to the shrinkage-fitting, so that the plurality of inner-diameter bulging portions of the non-magnetic ring are formed.

In a rotor of a rotating electrical machine according to the present invention, because a non-magnetic ring has a plurality of inner-diameter bulging portions that abut on the corresponding outer circumferential surfaces of the plurality of magnetic poles, the plurality of the magnetic poles can securely be fixed at predetermined positions in the rotor; therefore, an rotating electrical machine can be provided in which neither deterioration nor fluctuation in the cogging torque is caused and that causes neither physical enlargement nor cost increase.

In a manufacturing method for a rotor of a rotating electrical machine according to the present invention, provision is made for the steps of mounting a tube-shaped non-magnetic ring having a plurality of inner-diameter bulging portions on outer circumferential surfaces of the plurality of magnetic poles and forming a radial-direction extending portion, at at least one of the axis-direction end portions of the mounted non-magnetic ring, which extends inward in the radial direction of the non-magnetic ring; therefore, an rotating electrical machine can readily be manufactured in which neither deterioration nor fluctuation in the cogging torque is caused and that causes neither physical enlargement nor cost increase.

In a manufacturing method for a rotor of a rotating electrical machine according to the present invention, provision is made for the steps of press-fitting an approximately cylindrical non-magnetic ring on outer circumferential surfaces of the plurality of magnetic poles and forming a radial-direction extending portion, at least one of the axis-direction end portions of the press-fitted non-magnetic ring, which extends inward in the radial direction of the non-magnetic ring, and the approximately cylindrical non-magnetic ring is deformed due to the press-fitting, so that the plurality of inner-diameter bulging portions of the non-magnetic ring are formed; therefore, the non-magnetic ring having the plurality of inner-diameter bulging portions can readily be formed, whereby, an rotating electrical machine can readily be manufactured in which neither deterioration nor fluctuation in the cogging torque is caused and that causes neither physical enlargement nor cost increase.

In a manufacturing method for a rotor of a rotating electrical machine according to the present invention, provision is made for the steps of shrinkage-fitting an approximately cylindrical non-magnetic ring on outer circumferential surfaces of the plurality of magnetic poles and forming a radial-direction extending portion, at least one of the axis-direction end portions of the shrinkage-fitted non-magnetic ring, which extends inward in the radial direction of the non-magnetic ring, and the approximately cylindrical non-magnetic ring is deformed due to the shrinkage-fitting, so that the plurality of inner-diameter bulging portions of the non-magnetic ring are formed; therefore, the non-magnetic ring having the plurality of inner-diameter bulging portions can readily be formed, whereby, an rotating electrical machine can readily be manufactured in which neither deterioration nor fluctuation in the cogging torque is caused and that causes neither physical enlargement nor cost increase.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
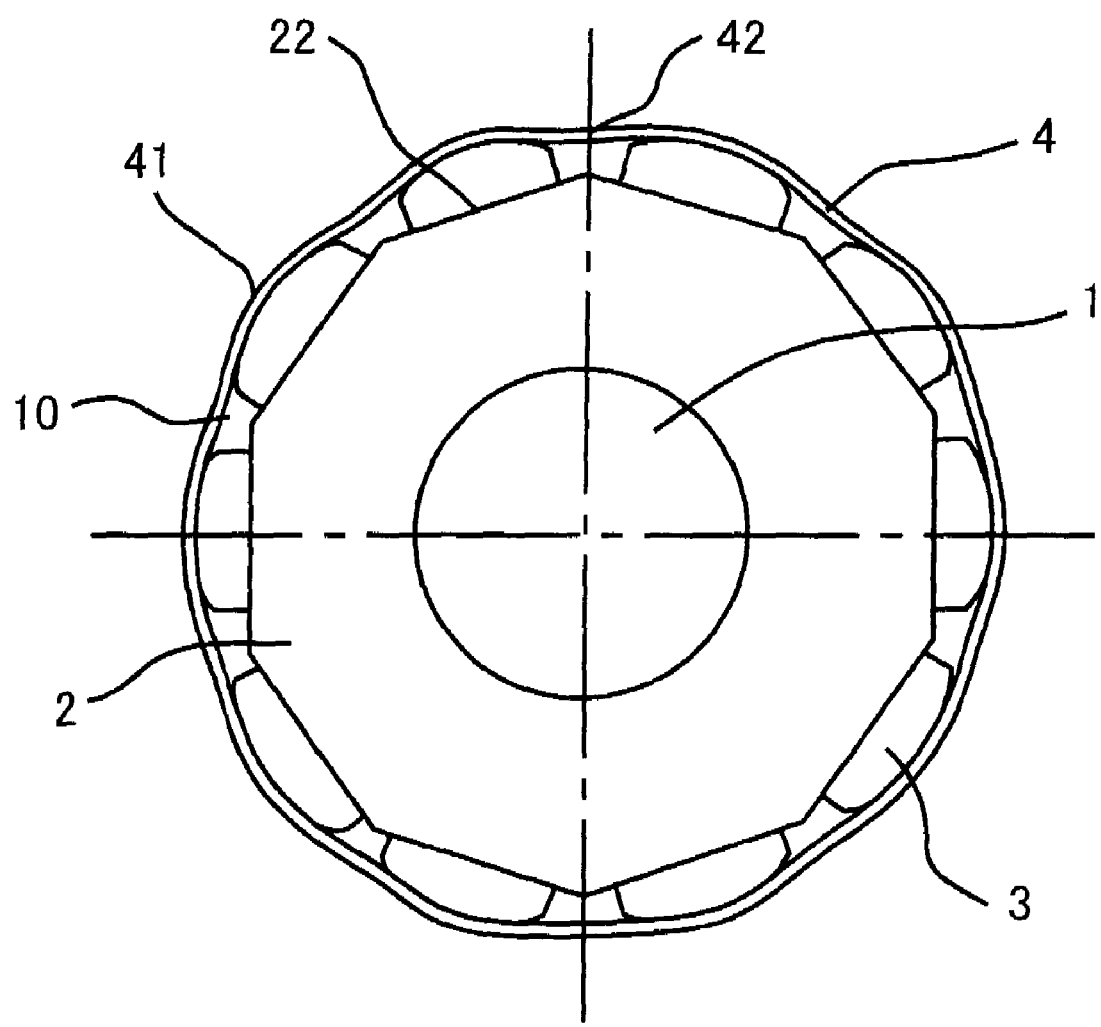
FIG. 1 is an explanatory transverse cross-sectional view of a rotor of a rotating electrical machine according to Embodiment 1 of the present invention.
Figure 2:
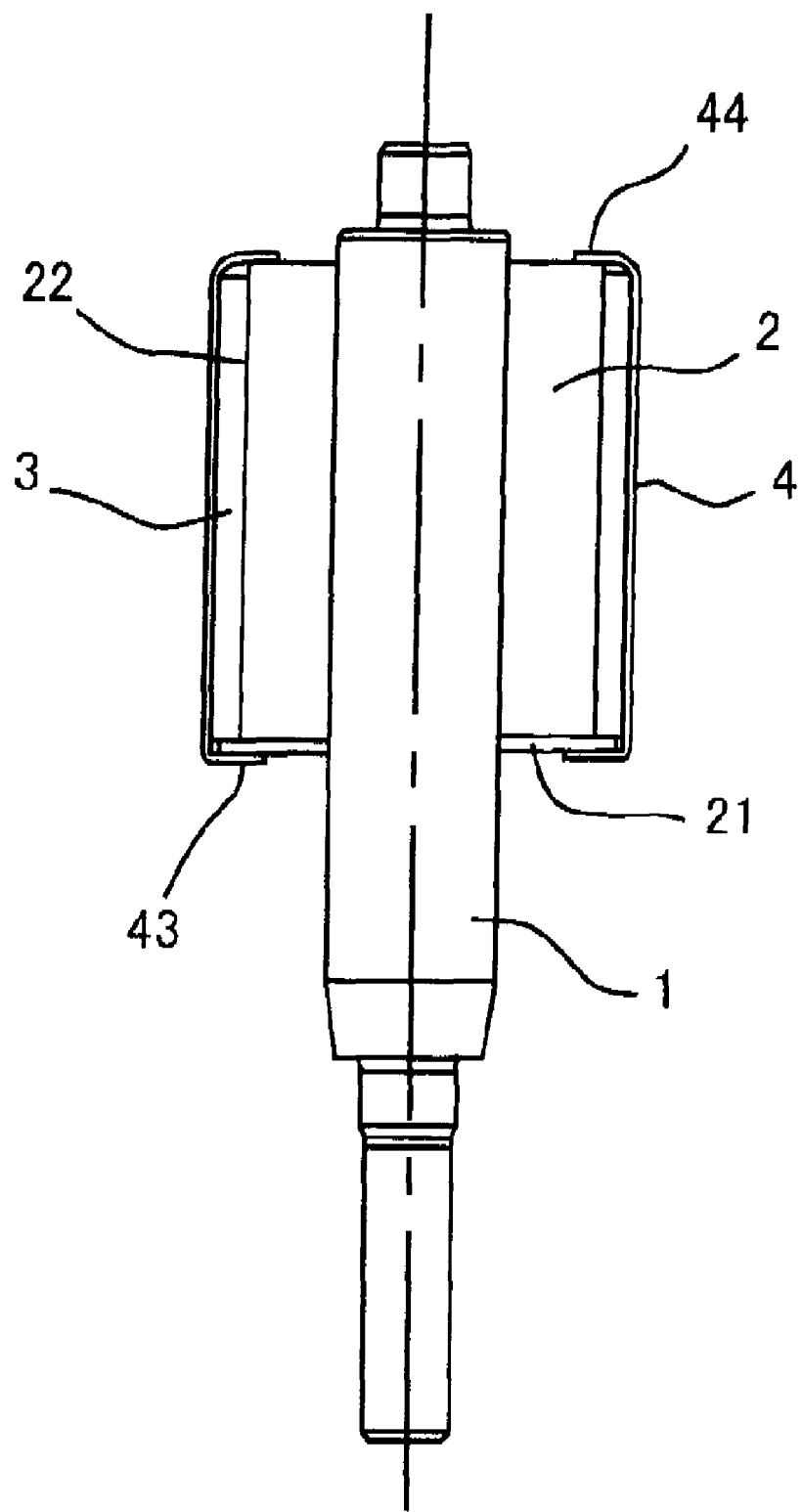
FIG. 2 is an explanatory longitudinal cross-sectional view of the rotor of a rotating electrical machine according to Embodiment 1 of the present invention.
Figure 3:
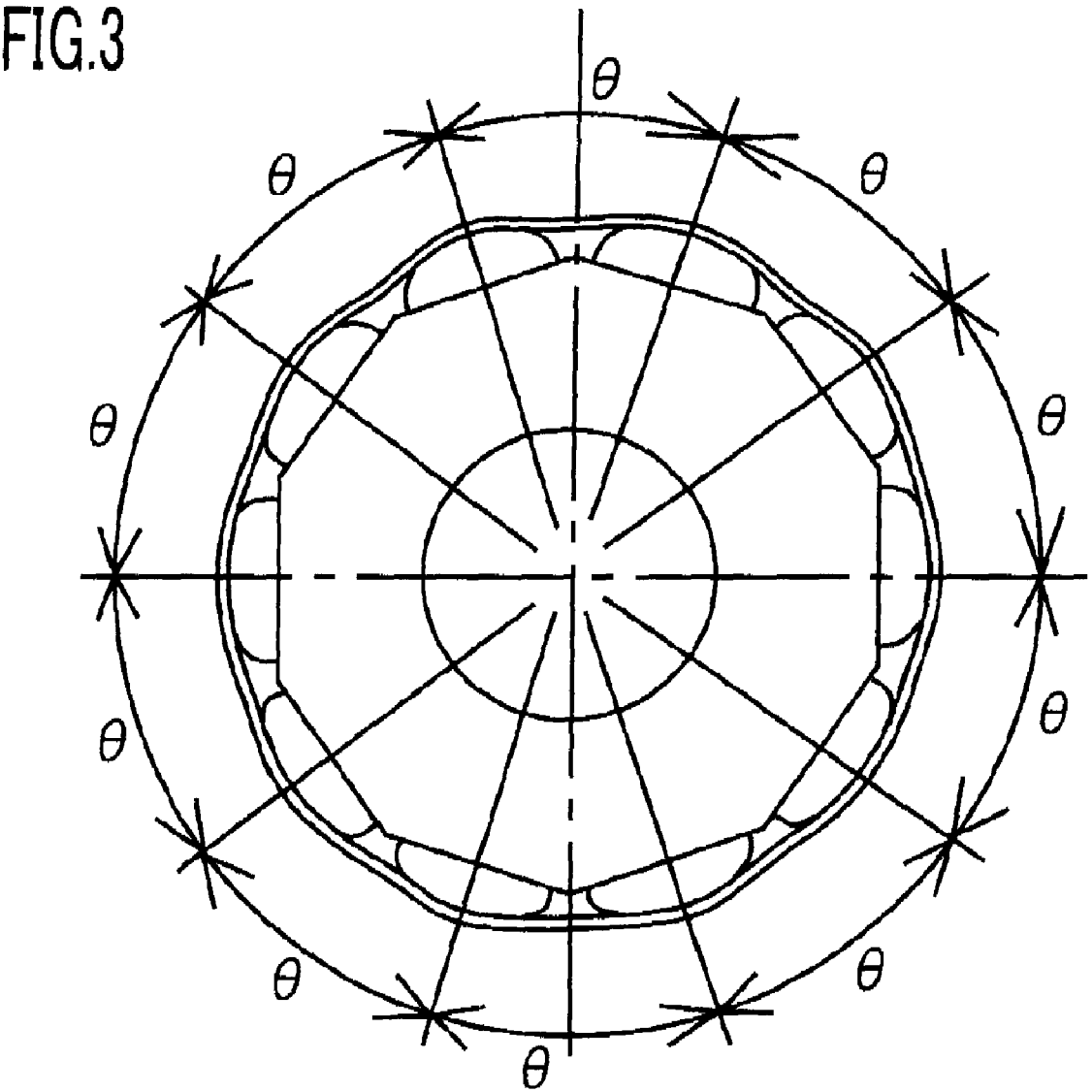
FIG. 3 is an explanatory transverse cross-sectional view of the rotor of a rotating electrical machine according to Embodiment 1 of the present invention.

A rotor of a rotating electrical machine according to Embodiment 1 of the present invention will be explained below with reference to FIGS. 1 to 3. FIG. 1 is an explanatory transverse cross-sectional view of a rotor of a rotating electrical machine according to Embodiment 1 of the present invention; FIG. 2 is an explanatory longitudinal cross-sectional view illustrating the rotor; FIG. 3 is an explanatory transverse cross-sectional view illustrating the rotor. In FIGS. 1 and 2, a rotor shaft 1 of an rotating electrical machine is pivotably supported by bearings (unillustrated) each provided in a pair of brackets (unillustrated). A rotor iron core 2, which is tubularly configured with ring-shaped magnetic thin plates laminated in the radial direction, and the rotor shaft 1, which is inserted into the central through-hole of the rotor iron core 2 through press fitting method or the like, are integrally fixed to each other.

An end plate 21 is fixed on one axis-direction end of the rotor iron core 2, by means of crimping or the like. As illustrated in FIGS. 1 and 3, the rotor iron core 2 is formed in such a way that the transverse cross section thereof has a shape of a regular decagon and is provided with ten magnetic-pole fixing portions 22, on the outer circumferential surface thereof, which are formed of rectangular flat surfaces each of which extends in the axis direction of the rotor iron core 2.

A magnetic pole 3, formed of a permanent magnet, is provided with a bottom surface formed of the rectangular flat surface, four side surfaces formed of flat surfaces approximately perpendicular to the bottom surface, and an outer circumferential surface that is connected to the side surfaces and approximately arc-shaped in the circumferential direction of the rotor iron core 2. Ten magnetic poles 3 configured as described above are fixed to the rotor iron core 2 in such a way that the respective bottom faces thereof are adhered by means of an adhesive to the corresponding magnetic-pole fixing portions 22 of the rotor iron core 2. These ten magnetic poles 3 are arranged spaced evenly apart from one another by the intermediaries of gaps 10, in the circumferential direction of the rotor iron core 2 with respect to the center axis of the rotor shaft 1.

A non-magnetic ring 4 formed of stainless steel, which is a non-magnetic material, is mounted in such a way as to cover the outer circumferential faces of the ten magnetic poles 3 fixed to the rotor iron core 2. The non-magnetic ring 4 is provided with as many inner-diameter bulging portions 41 as the magnetic poles 3 and has a tubular body, with these inner-diameter bulging portions 41 as gentle ridge lines thereof, whose transverse cross section is of approximately regular decagon.

The inner surface of the non-magnetic ring 4 makes contact with the respective outer circumferential faces of the magnetic poles 3, thereby exerting biasing force on each of the magnetic poles 3 inward in the radial direction of the non-magnetic ring 4. In addition, the non-magnetic ring 4 is configured in such a way that small diameter portions 42 are formed at the respective positions that are the approximate centers between the inner-diameter bulging portions 41, and the inner circumferential surface of the small diameter portion 42 corresponds to the minimal radius of the non-magnetic ring 4 and the inner circumferential surface of the inner-diameter bulging portion 41 corresponds to the maximal radius of the inner-diameter bulging portion 41. The relationship between the circumferential length L of the circumscribed circle for the magnetic poles 3 and the inner-circumference length L1 of the non-magnetic ring 4 is set in such a way that L>L1.

The radius of the inner circumferential surface of the inner-diameter bulging portions 41 of the non-magnetic ring 4 is set in such a way as to be equal to the distance between the center axis of the rotor iron core 2 and the arc-shaped outer circumferential surface of the magnetic pole 3; based on the pulling force of the non-magnetic ring 4, biasing force is exerted on each of the magnetic poles 3 inward in the radial direction of the rotor iron core 2, whereby the magnetic poles 3 are fixed to the corresponding magnetic-pole fixing portions 22 of the rotor iron core 2.

Moreover, as described above, the non-magnetic ring 4 has a shape of an approximate regular decagon having the inner-diameter bulging portions 41 and the small diameter portions 42, and each of the small diameter portions 42 is arranged in the gap 10 between the adjacent magnetic poles 3; therefore, the circumferential position, on the rotor iron core 2, of each of the magnetic poles 3 is securely restricted. Therefore, the circumferential position, on the rotor iron core 2, of each of the magnetic poles 3 is not changed by a vibration of the rotating electrical machine which is in operation.

Here, the respective configurations of the rotor iron core 2, the magnetic pole 3, and the non-magnetic ring 4 are generally explained. Supposing that the number of poles of the rotor of a rotating electrical machine, i.e., the number of the magnetic poles 3 is n, the non-magnetic ring 4 is formed to be an approximately regular n-sided polygon, and the magnetic-poles 3 are arranged spaced evenly apart from one another in the circumferential direction of the rotor. As illustrated in FIG. 3, the angle $\theta$ between the axes that, with respect to the center axis of the rotor shaft 1, pass the respective centers of the adjacent magnetic poles 3 is $360°/n$.

As illustrates in FIG. 2, the non-magnetic ring 4 has radial-direction extending portions 43 and 44 that are formed by bending both axial end portions of the non-magnetic ring 4 inward in the radial direction of the rotor iron core 2 so that both the axis-direction end portions extend in that direction; the radial-direction extending portion 43 abuts on the end plate 21 at one axis-direction end portion of the rotor iron core 2, and the radial-direction extending portion 44 abuts on the other axis-direction end surface of the rotor iron core 2. The relationship between the axis-direction length H of the magnetic-pole fixing portion 22 of the rotor iron core 2 and the axis-direction length H1 of the bottom surface of the magnetic pole 3 is set in such a way that H>H1; the magnetic pole 3 is disposed in such a way that one axis-direction end surface thereof is situated axially inside the axis-direction end surface of the rotor iron core 2.

As described above, because the radial-direction extending portions 43 and 44 are provided at the respective axis-direction end portions of the non-magnetic ring 4, the axis-direction positional deviation of the non-magnetic ring 4 can be restricted. Moreover, by making one axis-direction end surface of the magnetic pole 3 abut on the inner surface of the radial-direction extending portion 43 of the non-magnetic ring 4, force for restricting the axis-direction position of the magnetic pole 3 can be enhanced.

Still moreover, because both the axis-direction end surfaces of the magnetic pole 3 are covered with the radial-direction extending portions 43 and 44 of the non-magnetic ring 4, not only both the end surfaces of the magnetic pole 3 can be protected from in-bound foreign materials, but also even when being broken, the magnetic pole can be prevented from dispersing outward. As described above, the axis-direction length H1 of the bottom surface, which is a surface where the magnetic pole 3 is adhered to the iron core, is set to be shorter than the axis-direction length H of the magnetic-pole fixing portion 22 of the rotor iron core 2; therefore, the axis-direction end surfaces of the magnetic pole 3 can be situated axially inside the non-magnetic ring 4 as well as the magnetic-pole fixing portion 22 of the rotor iron core 2, whereby the axis-direction end surfaces of the magnetic pole 3 can be protected.

In Embodiment 1, because, as the non-magnetic ring 4, stainless steel is utilized, the weight of the non-magnetic ring 4 can be saved and the robustness thereof can be enhanced; thus, biasing force exerted on the magnetic pole 3 can be enhanced and high restriction force can be applied to the magnetic pole 3.

In the rotor of a rotating electrical machine, according to Embodiment 1 of the present invention, configured as described above, not only the non-magnetic ring 4 formed of a non-magnetic material exerts biasing force, which is oriented to the center of the rotor iron core 2, on the magnetic pole 3 formed of a permanent magnet, but also the circumferential position of the magnetic pole 3 can be restricted by means of the inner-diameter bulging portion of the non-magnetic ring 4. Accordingly, the arrangement restriction on the magnetic poles, which is effective in terms of measures for cogging torque, can readily be carried out.

Moreover, the circumferential positions, of the magnetic poles 3, which are arranged spaced evenly apart from one another in the circumferential direction of the rotor iron core 2 by use of the inner-diameter bulging portions 41 of the non-magnetic ring 4 are restricted and the positions do not change; therefore, the cogging torque is not increased by the change in the circumferential position of the magnetic pole, whereby the cogging torque can be reduced. Still moreover, because the magnetic poles 3 are arranged spaced evenly apart from one another in the circumferential direction, the pulling force produced in the non-magnetic ring 4 is homogeneous; therefore, the positional deviation of the magnetic pole 3 hardly occurs, whereby the magnetic poles 3 can securely be restricted in respective predetermined positions.

Embodiment 2

Figure 4:
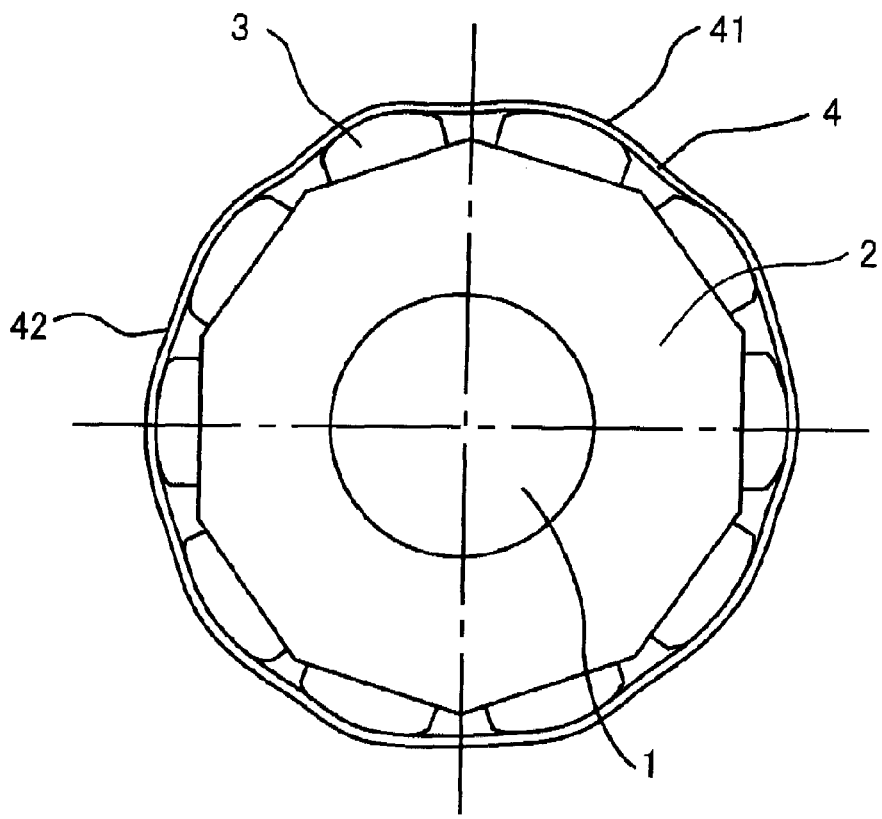
FIG. 4 is an explanatory transverse cross-sectional view of a rotor of a rotating electrical machine according to Embodiment 2 of the present invention.
Figure 5:
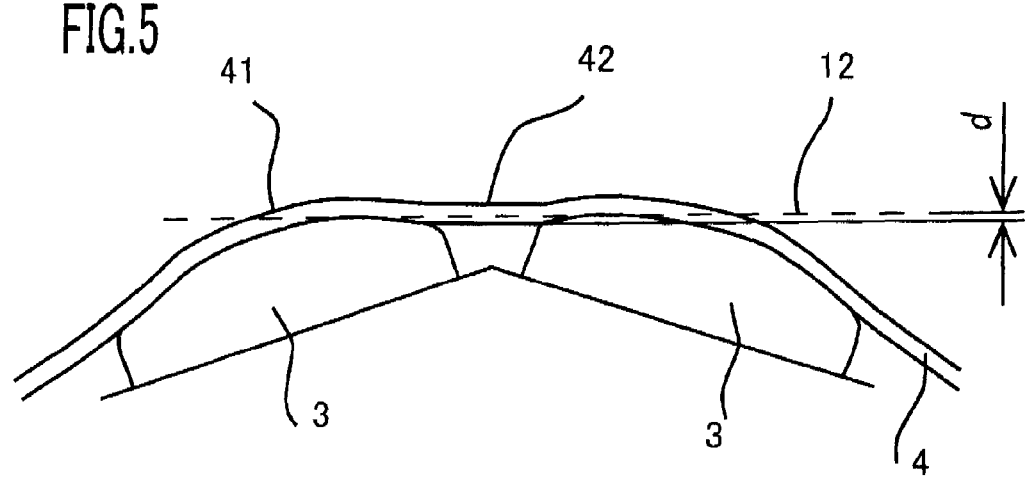
FIG. 5 is a partially enlarged explanatory transverse cross-sectional view of the rotor of a rotating electrical machine according to Embodiment 2 of the present invention.

Next, a rotor of a rotating electrical machine according to Embodiment 2 of the present invention will be explained with reference to FIGS. 4 and 5. FIG. 4 is an explanatory transverse cross-sectional view of a rotor of a rotating electrical machine according to Embodiment 2 of the present invention; FIG. 5 is a partially enlarged explanatory transverse cross-sectional view illustrating the rotor. In FIG. 4, the shape of an aluminum-made non-magnetic ring 4, disposed on the outer circumferential surfaces of magnetic poles 3 formed of a permanent magnet, is formed in such a way that the inner circumferential surface thereof lies on a tangential line 12 that passes on the outer circumferential surfaces of the magnetic poles 3 that are adjacent to each other or on a line that is shifted from the tangential lime 12 toward the rotor iron core 2. In other words, as illustrated in FIG. 5, the distance d, in the radial direction of the rotor iron core 2, between the tangential line 12 that passes on the outer circumferential surfaces of the magnetic poles 3 that are adjacent to each other and the inner circumferential surface of the non-magnetic ring 4 is set in such a way that d≧0, assuming that the direction from the tangential line 12 to the center of the rotor iron core 2 is positive. In addition, other configurations are the same as those of the rotor of a rotating electrical machine according to Embodiment 1.

When the inner circumferential surface of the non-magnetic ring 4 coincides with the tangential line 12 on the outer circumferences of the magnetic poles 3 that are adjacent to each other, the circumferential length of the non-magnetic ring 4 becomes geometrically minimal; therefore, not only the amount of materials to be used can be reduced, but also large biasing forces that are exerted on the magnet in the radial and circumferential directions can be obtained, whereby robust positional restriction can be achieved. In addition, when the inner circumferential surface of the non-magnetic ring 4 falls radially inside the tangential line 12 on the outer circumferences of the magnetic poles 3 that are adjacent to each other, the contact area between the magnetic pole 3 and the non-magnetic ring 4 increases, whereby positional-restriction accuracy is enhanced in particular.

In the rotor of a rotating electrical machine, according to Embodiment 2, configured as described above, the inner circumferential surface of the non-magnetic ring 4 coincides with the tangential line 12 on the outer circumferences of the magnetic poles 3 that are adjacent to each other, or falls inside the tangential line 12, in the radial direction of the rotor; therefore, because the contact area between the magnetic pole 3 and the non-magnetic ring 4 increases, an effect is demonstrated in which the circumferential position of the magnetic pole 3 is restricted in particular, whereby the accuracy of arrangement position for the magnetic pole 3 is enhanced.

Moreover, in Embodiment 2, because the non-magnetic ring 4 is formed of aluminum, the costs of the rotor can further be reduced and the downsizing of the rotor can be carried out. In general, with increase in the temperature, the residual magnetic flux density in the magnetic pole 3 formed of a permanent magnet decreases; however, because, in Embodiment 2 of the present invention, the non-magnetic ring 4 is formed of aluminum having a high heat conductivity and, as described above, the area where the non-magnetic ring 4 abuts on the outer circumferential surface of the magnetic pole 3 is enlarged by setting d to be the same as or larger than zero, the heat of the magnetic pole 3 is effectively diffused through the non-magnetic ring 4 and the amount of heat, which is radiated, due to the rotation of the rotor, from the outer circumferential surface of the non-magnetic ring 4 can be increased; thus, not only the demagnetization-proof properties of the magnetic pole 3 can be enhanced, but also the properties of the rotating electrical machine can be improved.

Embodiment 3

Figure 6:
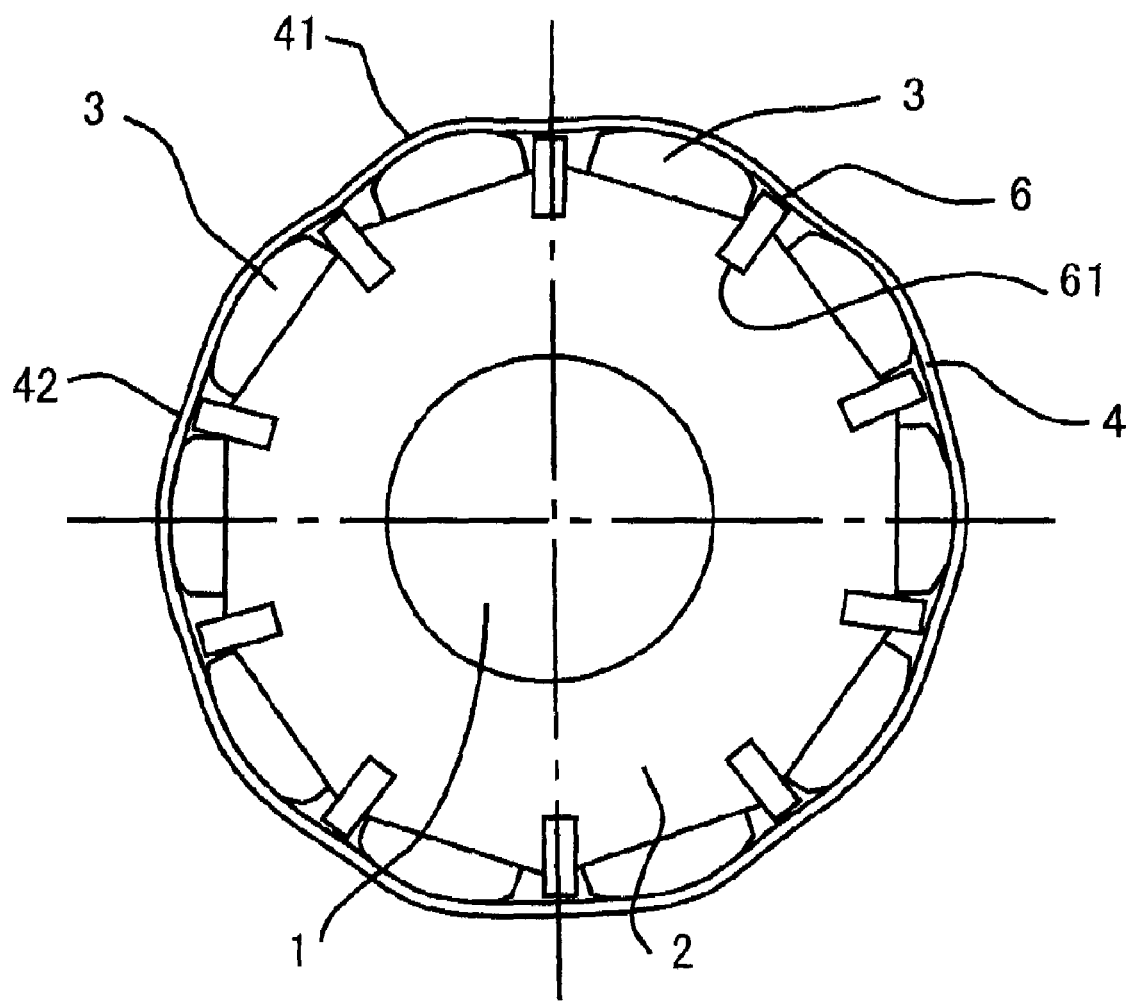
FIG. 6 is an explanatory transverse cross-sectional view of a rotor of a rotating electrical machine according to Embodiment 3 of the present invention.

Next, a rotor of a rotating electrical machine according to Embodiment 3 of the present invention will be explained with reference to FIG. 6. FIG. 6 is an explanatory transverse cross-sectional view of a rotor of a rotating electrical machine according to Embodiment 3 of the present invention. In Embodiments 1 and 2, the positional restriction on the magnetic pole 3 is realized by the adhesive power, through an adhesive, between a magnetic-pole fixing portion 22 of a rotor iron core 2 and a magnetic pole 3 and by the circumferential-direction positional restriction force of a non-magnetic ring 4; however, in the rotor of a rotating electrical machine according to Embodiment 3, positioning mechanisms that restrict the circumferential-direction positions of the magnetic poles 3 are provided in the rotor iron core 2.

In other words, in FIG. 6, each of positioning mechanisms 6 is constituted with a protrusion member that extends on the outer circumferential surface of the rotor iron core 2, along the shaft of the rotor iron core 2, and formed of a non-magnetic material such as stainless steel, aluminum, or resin. Ten positioning mechanisms 6 are provided on the circumferential surface of the rotor iron core 2; the positioning mechanisms 6 are arranged spaced evenly apart from one another in the circumferential direction of the rotor iron core 2.

Each of the positioning mechanisms 6 is fixed pressure-inserted into a U-shaped groove 61 formed in the ridge-line portion on the outer circumferential surface of the rotor iron core 2, and formed in such a way that the length thereof is approximately the same as that of the axis-direction length of the rotor iron core 2; at least one of the side surfaces, of the positioning mechanism 6, which is oriented to the circumferential direction thereof abuts on at least one of the side surfaces, of the magnetic pole 3, which is oriented to the circumferential direction thereof, so that the circumferential-direction position of that magnetic pole 3 is restricted.

Each of the positioning mechanisms 6 may be fixed inserted into the U-shaped groove 61 and adhered through an adhesive, or may be fixed adhered through an adhesive, without providing any U-shaped groove 61. Moreover, each of the positioning mechanisms 6 may be fixed on the outer circumferential surface of the rotor iron core 2 by means of welding or the like, without providing the U-shaped groove 61. In addition, other configurations are the same as those in Embodiment 1 or Embodiment 2.

In the rotor of a rotating electrical machine according to Embodiment 3 of the present invention, the circumferential-direction position of the magnetic pole 3 can securely be restricted by making the magnetic pole 3 abut on the positioning mechanism 6. Moreover, by combining the restriction force due to the positioning mechanisms 6 with the circumferential-direction restriction force, exerted on the magnetic poles 3, due to the polygon-shaped non-magnetic ring 4 having inner-diameter bulging portions 41, extremely large positional-restriction force can be obtained. In addition, the material that forms the positioning mechanism 6 can arbitrarily be selected; however, as described above, by utilizing a non-magnetic material such as stainless steel, aluminum, or resin, the leakage magnetic flux from the magnetic poles can be reduced, so that the torque can be enhanced.

Embodiment 4

Figure 7:
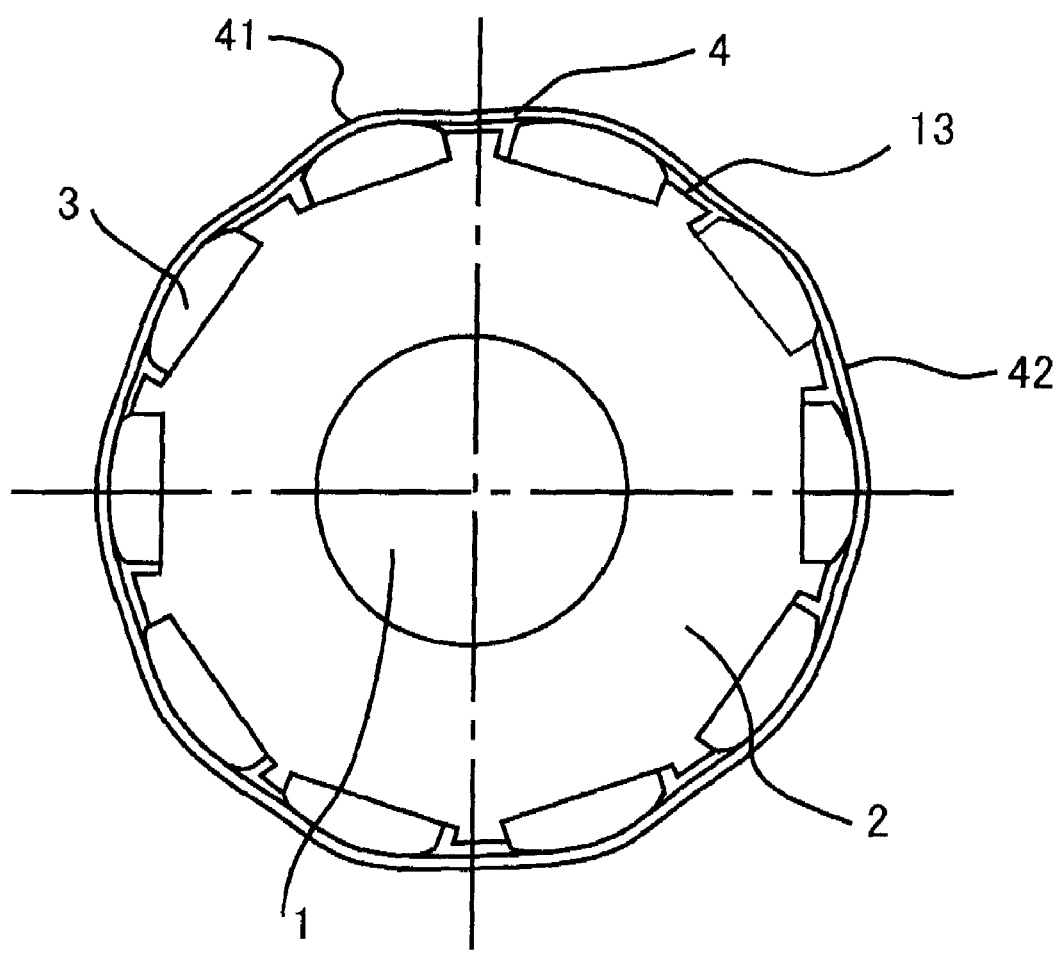
FIG. 7 is an explanatory transverse cross-sectional view of a rotor of a rotating electrical machine according to Embodiment 4 of the present invention.
Figure 8:
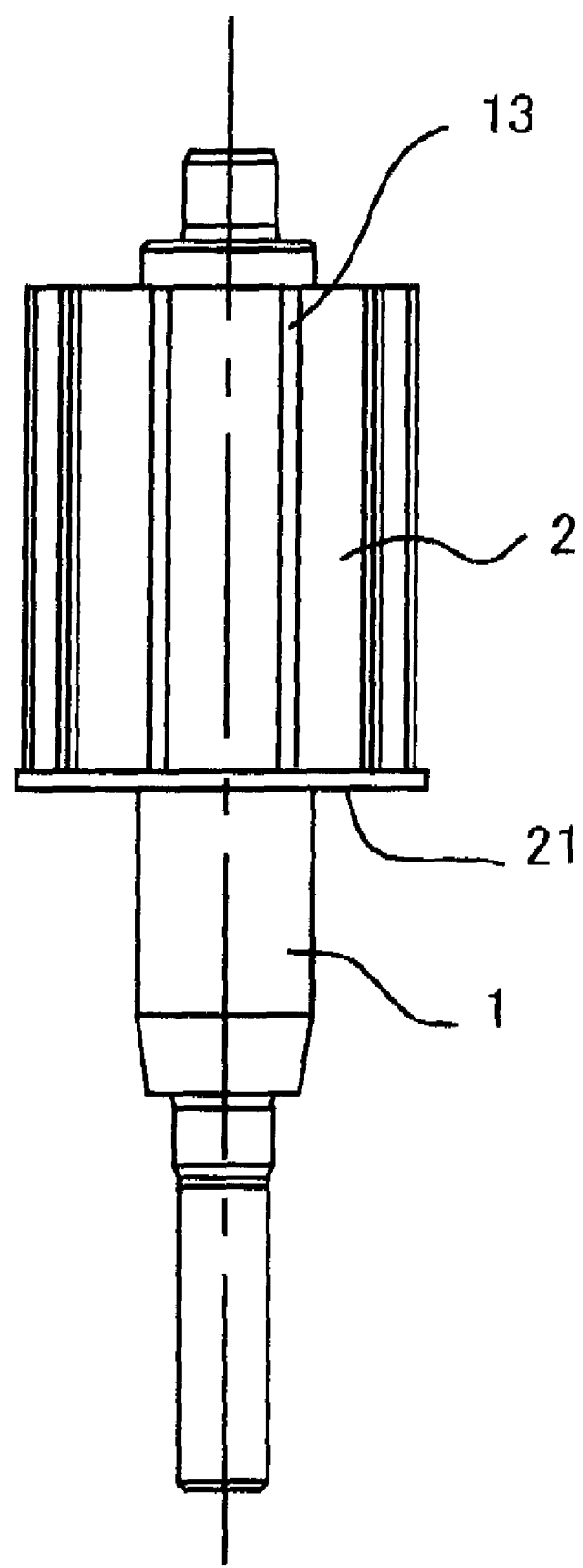
FIG. 8 is an explanatory view of the rotor of a rotating electrical machine, according to Embodiment 4 of the present invention, in the case where it has not been mounted.

Next, a rotor of a rotating electrical machine according to Embodiment 4 of the present invention will be explained with reference to FIGS. 7 and 8. FIG. 7 is an explanatory transverse cross-sectional view of a rotor of a rotating electrical machine according to Embodiment 4 of the present invention; FIG. 8 is an explanatory view of the rotor in the case where it has not been mounted. In FIGS. 7 and 8, a positioning mechanism 13 is formed of a protrusion member that extends radially outward from the outer circumferential surface of a rotor iron core 2. The positioning mechanisms 13 are formed by being punched integrally with a magnetic thin plate that is incorporated in the rotor iron core 2.

Ten positioning mechanisms 13 configured as described above extend, in the axis direction, along the ridge-line portions of the rotor iron core 2; each of the positioning mechanisms 13 is formed in such a way that the length thereof is approximately the same as axis-direction length of the rotor iron core 2; at least one of the side surfaces, of the positioning mechanism 13, which is oriented to the circumferential direction thereof abuts on at least one of the side surfaces, of a magnetic pole 3, which is oriented to the circumferential direction thereof, so that the circumferential-direction position of that magnetic pole 3 is restricted. In addition, other configurations are the same as those in Embodiment 1 or Embodiment 2.

In the rotor of a rotating electrical machine according to Embodiment 4 of the present invention, the positioning mechanism 13 for positioning the circumferential-direction position of the magnetic pole 3 is formed integrally with the rotor iron core 2; therefore, the configuration is simplified and the manufacturing is readily carried out. Moreover, as is the case with Embodiment 3, by combining the restriction force due to the positioning mechanisms 13 with the circumferential-direction restriction force due to the polygon-shaped non-magnetic ring 4 having inner-diameter bulging portions 41, larger positional-restriction force exerted on the magnetic poles 3 can be obtained.

Embodiment 5

Figure 9:
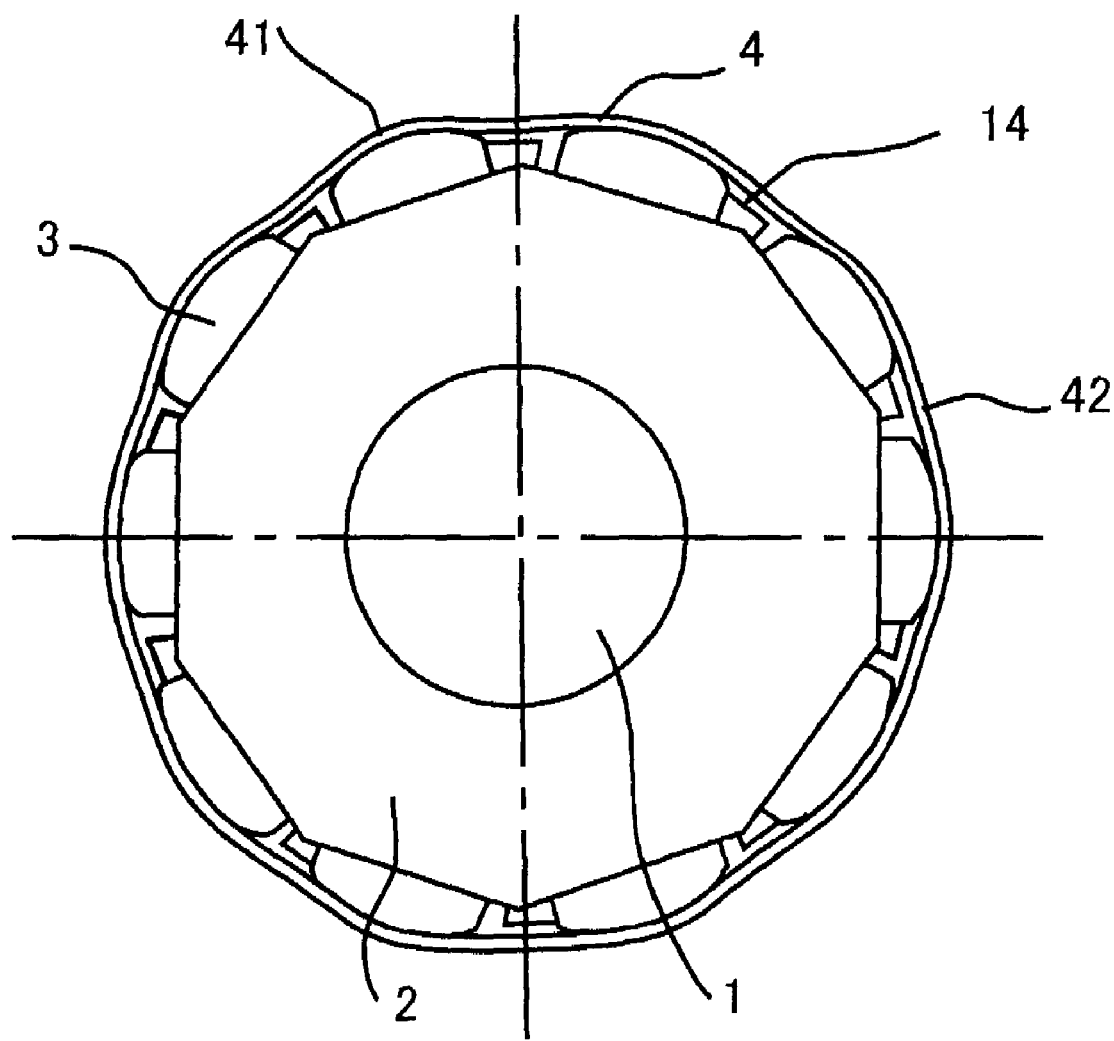
FIG. 9 is an explanatory transverse cross-sectional view of a rotor of a rotating electrical machine according to Embodiment 5 of the present invention.
Figure 10:
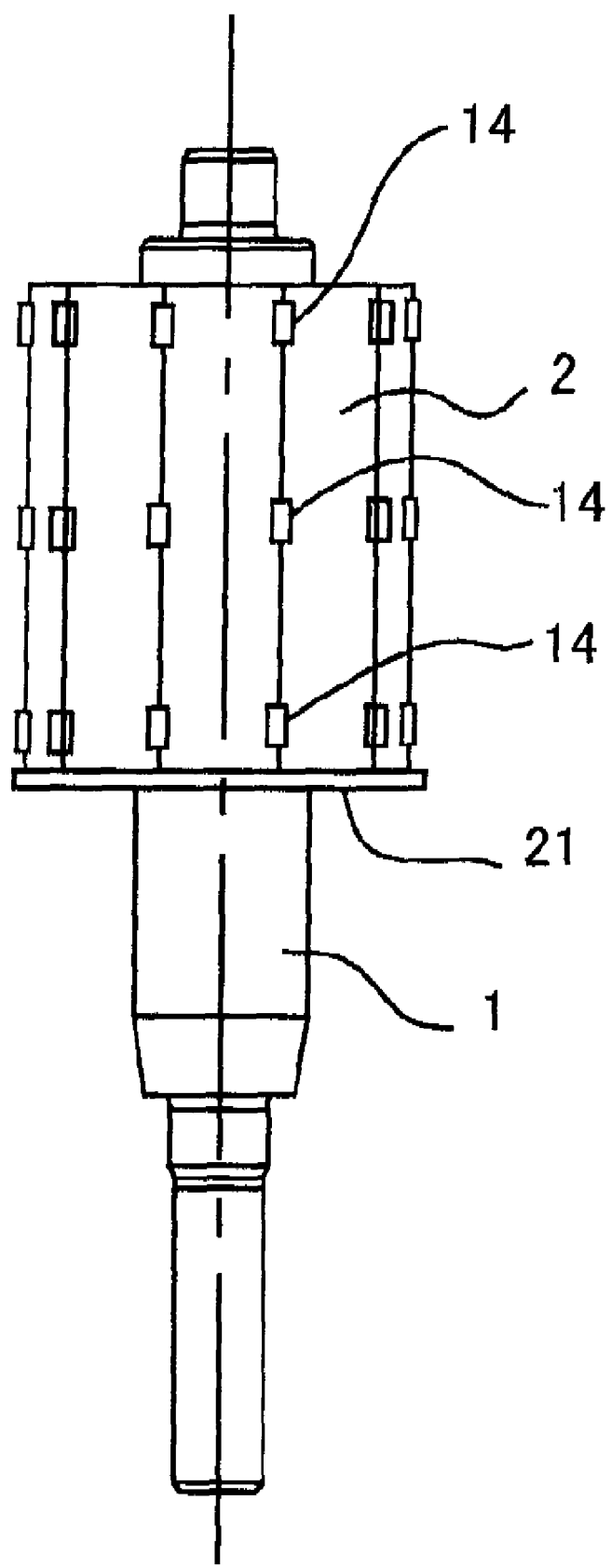
FIG. 10 is an explanatory longitudinal cross-sectional view of the rotor of a rotating electrical machine according to Embodiment 5 of the present invention.

A rotor of a rotating electrical machine according to Embodiment 5 of the present invention will be explained with reference to FIGS. 9 and 10. FIG. 9 is an explanatory transverse cross-sectional view of a rotor of a rotating electrical machine according to Embodiment 5 of the present invention; FIG. 10 is an explanatory longitudinal cross-sectional view illustrating the rotor. In FIGS. 9 and 10, a positioning mechanism 14 is formed of a protrusion member whose axis-direction length is short and that extends radially outward from the outer circumferential surface of a rotor iron core 2. Three positioning mechanisms 14 are arranged spaced apart from one another in each of the ridge-line portions on the outer circumferential surface of the rotor iron core 2. The positioning mechanisms 14 are formed by being punched integrally with a magnetic thin plate that is incorporated in the rotor iron core 2. In addition, it goes without saying that the number of the positioning mechanisms 14, provided in each of the ridge-line portions on the outer circumferential surface of the rotor iron core 2, can arbitrarily be set.

The positioning mechanisms 14 configured as described above extend, in the axis direction, along the ridge-line: portions of the rotor iron core 2; at least one of the side surfaces, of each of the positioning mechanisms 14, which is oriented to the circumferential direction thereof abuts on at least one of the side surfaces, of a magnetic pole 3, which is oriented to the circumferential direction thereof, so that the circumferential-direction position of that magnetic pole 3 is restricted. In addition, other configurations are the same as those in Embodiment 1 or Embodiment 2.

In the rotor of a rotating electrical machine according to Embodiment 5 of the present invention, by combining the restriction force due to the positioning mechanisms 14 with the circumferential-direction restriction force due to a polygon-shaped non-magnetic ring 4 having inner-diameter bulging portions 41, not only larger positional-restriction force exerted on the magnetic poles 3 can be obtained, but also the volume of the magnetic member, which is a positioning mechanism existing between the magnetic poles, can be reduced compared with the volume in the case of Embodiment 4; thus, the leakage magnetic flux from the magnetic poles can be reduced and the torque of the rotating electrical machine can be enhanced.

Embodiment 6

Figure 11:
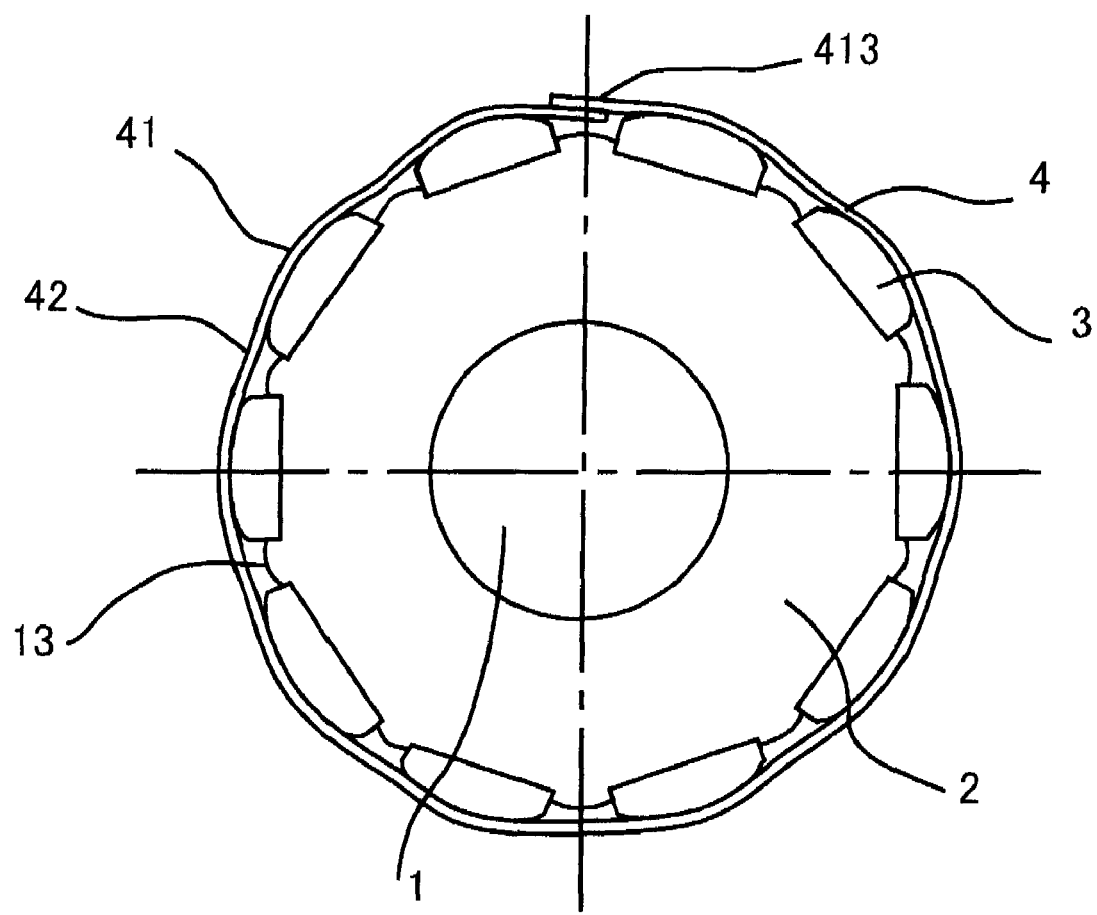
FIG. 11 is an explanatory transverse cross-sectional view of a rotor of a rotating electrical machine according to Embodiment 6 of the present invention.
Figure 12:
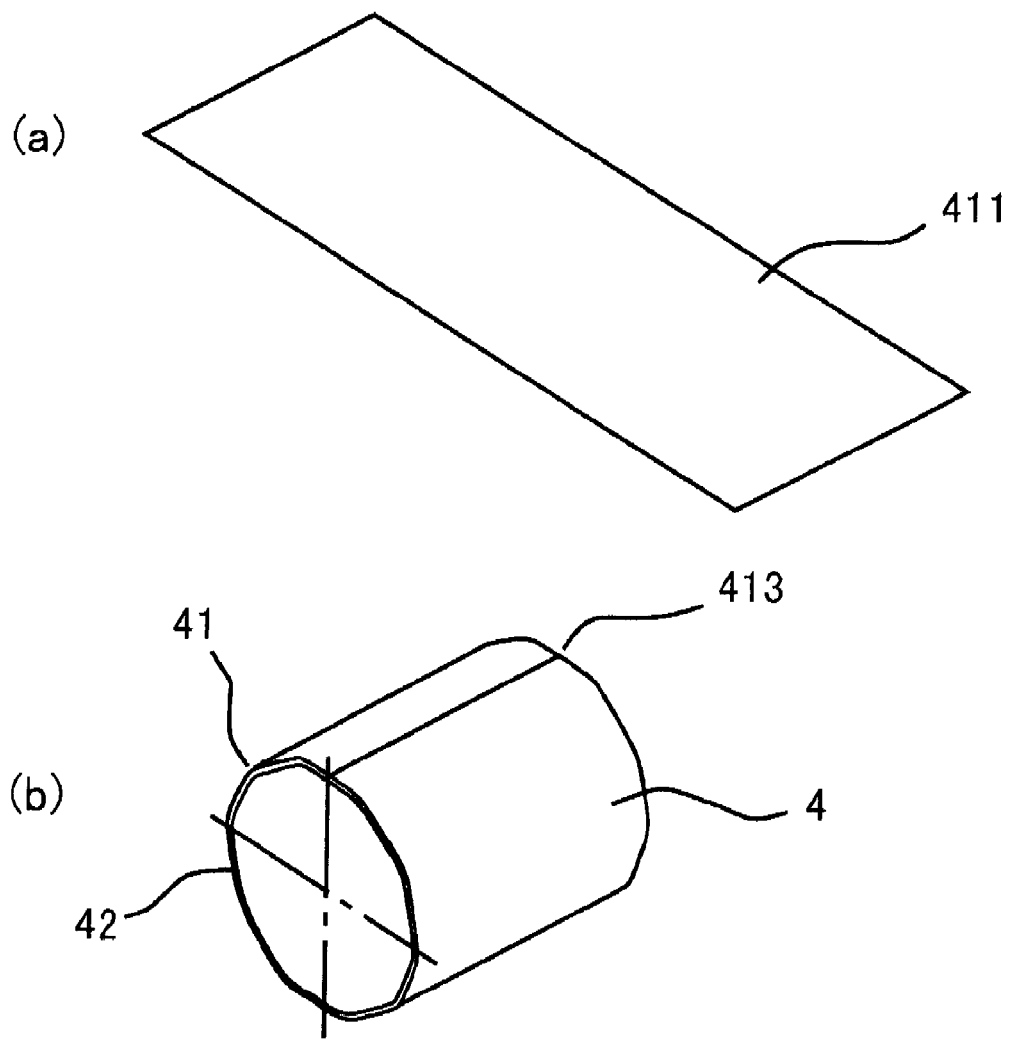
FIG. 12 is a set of explanatory views illustrating a non-magnetic ring of the rotor of a rotating electrical machine according to Embodiment 6 of the present invention.

Next, a rotor of a rotating electrical machine according to Embodiment 6 of the present invention will be explained with reference to FIGS. 11 and 12. FIG. 11 is an explanatory transverse cross-sectional view of a rotor of a rotating electrical machine according to Embodiment 6 of the present invention; FIG. 12 is explanatory views illustrating a non-magnetic ring for the rotor. In FIG. 11, as is the case with Embodiments 1 to 5, a non-magnetic ring 4 is provided with inner-diameter bulging portions 41 and small diameter portions 42 the numbers of which are the same as the number of magnetic poles 3. Positioning mechanisms 13 that are the same as those of Embodiment 4 are provided on the outer circumferential surface of a rotor iron core 2. In addition, the positioning mechanism 13 may be configured in the same manner as the positioning mechanism in Embodiment 3 or Embodiment 5. Moreover, as is the case with Embodiment 1 or Embodiment 2, the positioning mechanisms may not be provided.

With regard to the non-magnetic ring 4, a flat plate 411, illustrated in FIG. 12(a), formed of stainless steel which is a non-magnetic material is firstly bent in its longitudinal direction, as illustrated in FIG. 12(b), so that it is formed to be an approximate polygon-shaped tube having inner-diameter bulging portions 41 the number of which is the same as that of the magnetic poles 3. In this situation, both end portions of the flat plate 411 overlap each other by a predetermined size.

After that, as is the case with Embodiment 1, the overlapped portion is bonded through TIG welding, laser welding, ultrasonic welding, or the like, so that a bonding portion 413 is formed.

The bonding portion 413 of the non-magnetic ring 4 is disposed between the magnetic poles 3 so as not to interfere with the magnetic poles 3. Accordingly, even when the thickness of the bonding portion 413 of the non-magnetic ring 4 is larger than other portions thereof, the bonding portion 413 does not abut on the outer circumferential surface of the magnetic pole 3. Moreover, the position, of the non-magnetic ring 4, between the magnetic poles is a position where the contour size of the rotor iron core 2 is minimal; therefore, the outer diameter of the bonding portion 413 can be made smaller than that of a maximal-diameter portion of the non-magnetic ring 4.

Still moreover, by disposing the bonding portion 413 of the non-magnetic ring 4 between the magnetic poles, the circumferential position of the magnetic pole 3 can securely be restricted while avoiding the interference between the bonding portion 413 and the magnetic poles 3. Additionally, disposing the bonding portion 413 between the magnetic poles is appropriate arrangement for the bonding portion 413 also in terms of robustness because, even though the bonding portion 413 of the non-magnetic ring 4 may be inferior, in terms of robustness, to other portions thereof, the bonding portion 413 is prevented from making contact with the outer circumferential surface of the magnetic pole 3 whose size changes so much that extra robustness thereof is required. Other configurations are the same as those in any one of Embodiments 1 to 5.

In the rotor of a rotating electrical machine, according to Embodiment 6 of the present invention, configured as described above, the non-magnetic ring 4 is produced by bending the flat plate 411, so that the yield rate of the material becomes high, compared with the manufacturing method such as deep drawing through press machining or the like. Moreover, it is made possible to form the non-magnetic ring 4 with a small-thickness or even-thickness material; thus, the non-magnetic ring 4 can be manufactured at low cost, compared with the case where a material having a shape of the non-magnetic ring is cut out by a predetermined length.

Embodiment 7

Figure 13:
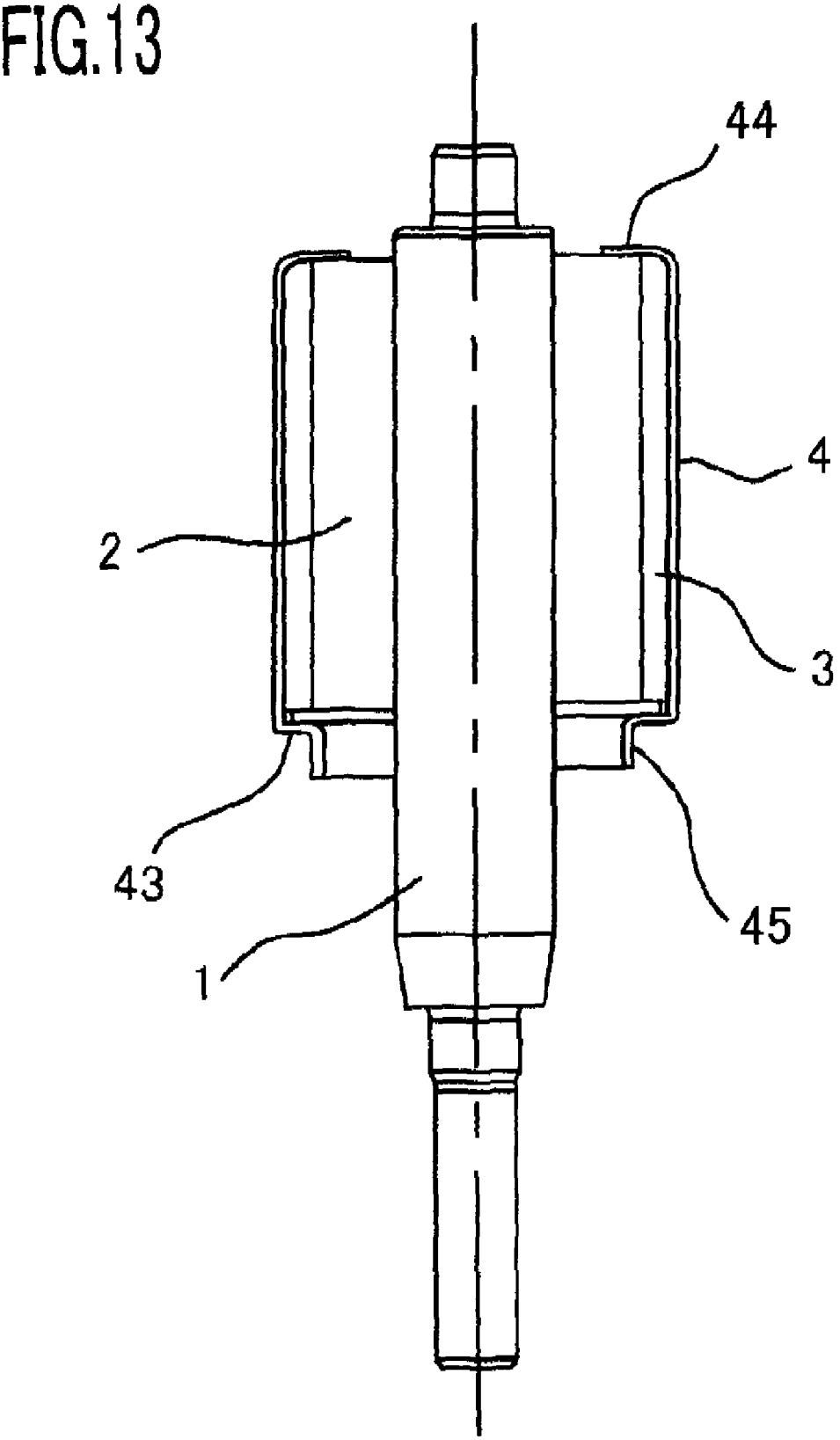
FIG. 13 is an explanatory longitudinal cross-sectional view of a rotor of a rotating electrical machine according to Embodiment 7 of the present invention.

A rotor of a rotating electrical machine according to Embodiment 7 of the present invention will be explained with reference to FIG. 13. FIG. 13 is an explanatory longitudinal cross-sectional view of a rotor of a rotating electrical machine according to Embodiment 7 of the present invention. In FIG. 13, a non-magnetic ring 4 is provided with a radial-direction extending portion 43, at one axial-direction end portion thereof, that is bent inward in the radial direction thereof and extends in the radial direction thereof; and an axis-direction extending portion 45 that is bent at the radial-direction inner end portion of the radial-direction extending portion 43 and extends along the axis direction. Other configurations are the same as those in any one of Embodiments 1 to 6.

As described above, by providing the axis-direction extending portion 45 in the non-magnetic ring 4, biasing force can be enhanced which is exerted on a plurality of the magnetic poles 3 in the direction that is oriented to the center of a rotor iron core 2. Moreover, the variations in the axis-direction length of the non-magnetic ring 4 are absorbed by adjusting the extending length of the axis-direction extending portion 45, so that the axis-direction length between the radial-direction extending portions 43 and 44, situated at both the axis-direction end portions, can arbitrarily be decided.

Still moreover, because the non-magnetic ring 4 is provided with the axis-direction extending portion 45, the distance between the axis-direction end of the axis-direction extending portion 45 and the axis-direction end surface of the magnetic pole 3 becomes long; thus, the intrusion of in-bound foreign materials and the dispersion of magnetic-pole splinters upon the breakage of the magnetic pole 3 can more securely be prevented.

Embodiment 8

Figure 14:
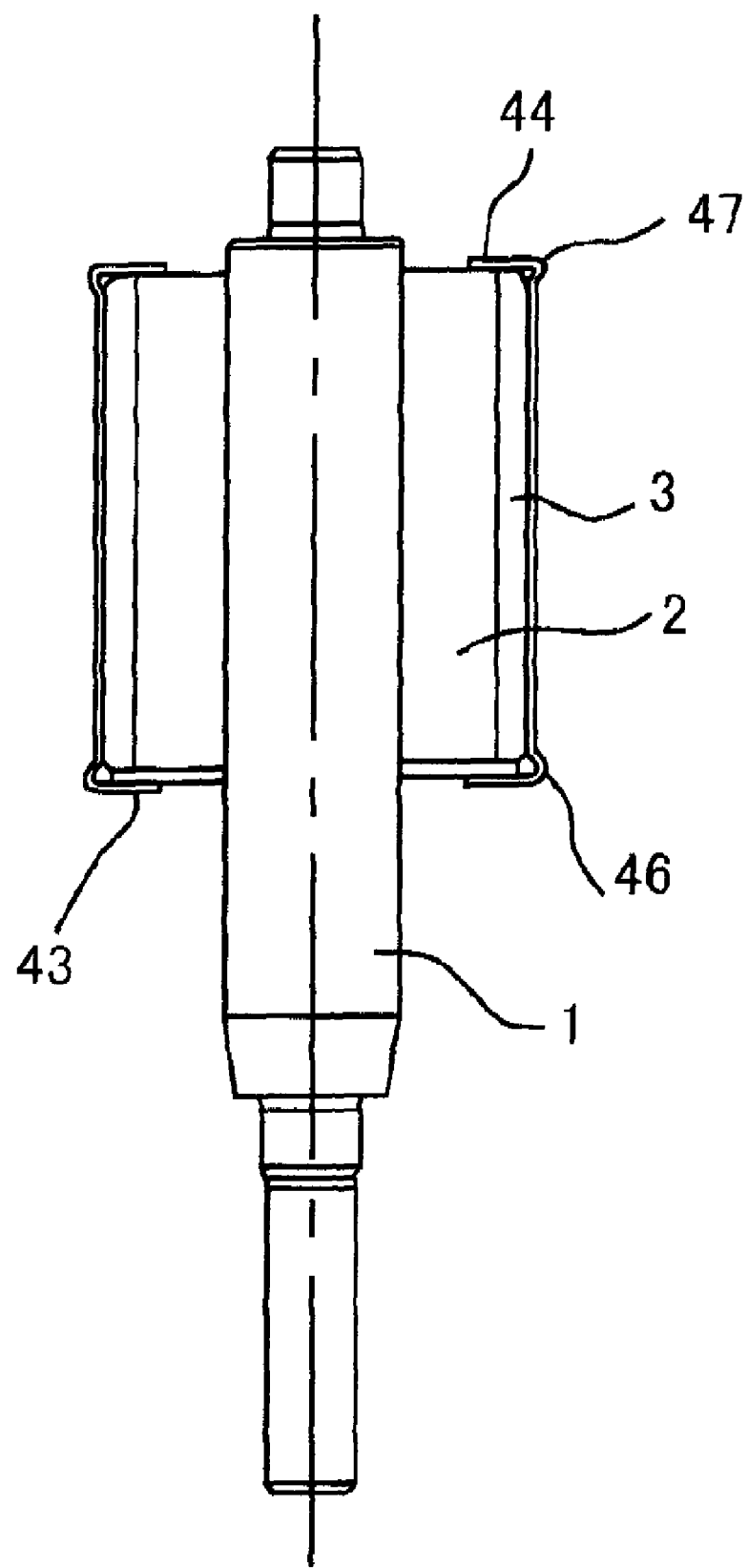
FIG. 14 is an explanatory longitudinal cross-sectional view of a rotor of a rotating electrical machine according to Embodiment 8 of the present invention.

Next, a rotor of a rotating electrical machine according to Embodiment 8 will be explained. FIG. 14 is an explanatory longitudinal cross-sectional view of a rotor of a rotating electrical machine according to Embodiment 8 of the present invention. In FIG. 14, a non-magnetic ring 4 is provided with large-diameter portions 46 and 47, in the vicinities of both axis-direction end portions, which protrude radially outward from other portions. Other configurations are the same as those in any one of Embodiments 1 to 6. In addition, as is the case with Embodiment 7, the axis-direction extending portion 45 may be formed.

In the rotor of a rotating electrical machine according to Embodiment 8, by forming the large-diameter portions 46 and 47 of the non-magnetic ring 4 while making only their contour sizes larger than other portions, the gaps between the large-diameter portions 46 and 47 and the stator are diminished; therefore, the intrusion of foreign materials from the axis-direction end portions of the rotor can be suppressed. Moreover, due to the machining for forming the large-diameter portions 46 and 47, the non-magnetic ring 4 further hardens; thus, the positional-restriction force exerted on magnetic poles 3 and the positional-restriction force exerted on the non-magnetic ring 4 itself can be enhanced.

Embodiment 9

Figure 15:
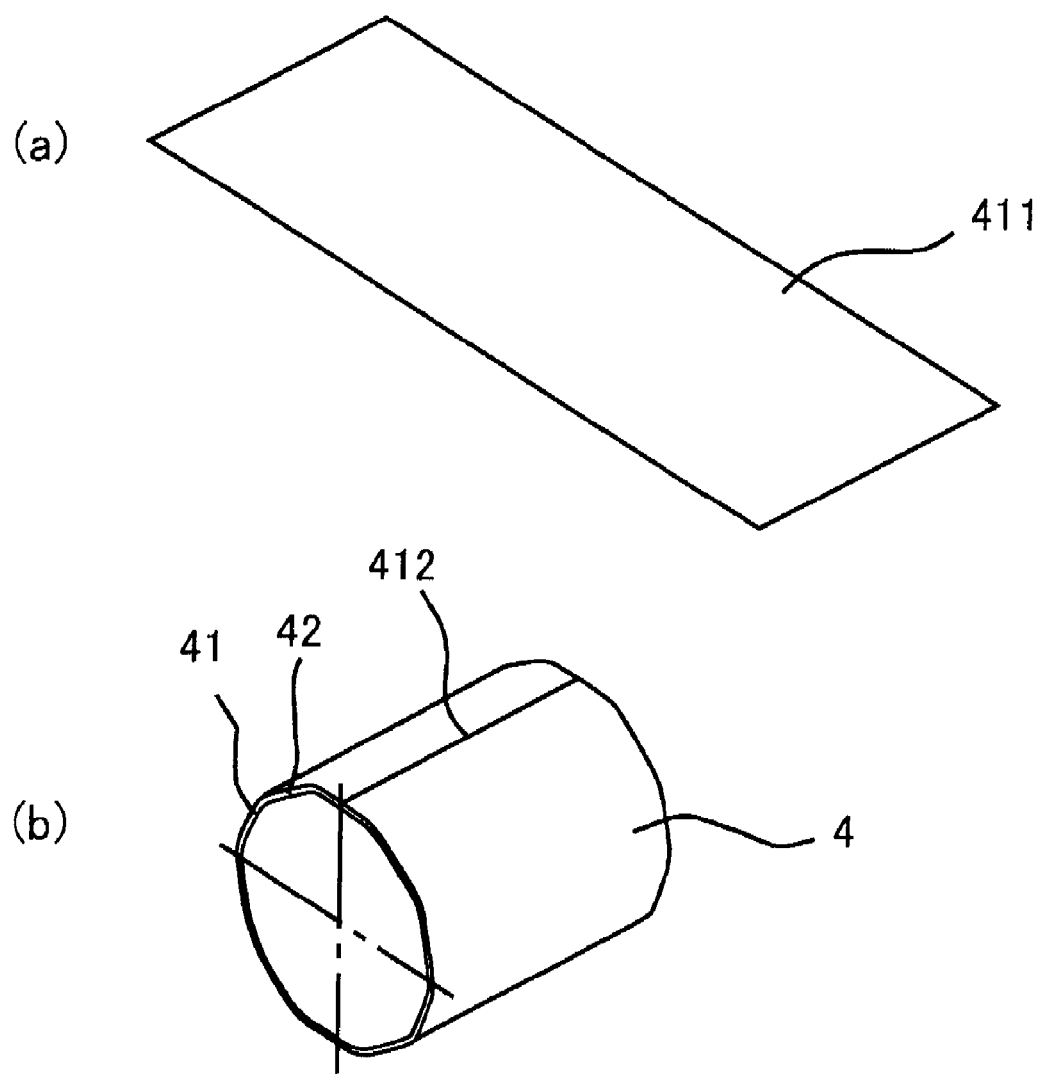
FIG. 15 is an explanatory view for explaining a manufacturing method, for a rotor of a rotating electrical machine, according to Embodiment 9 of the present invention.
Figure 16:
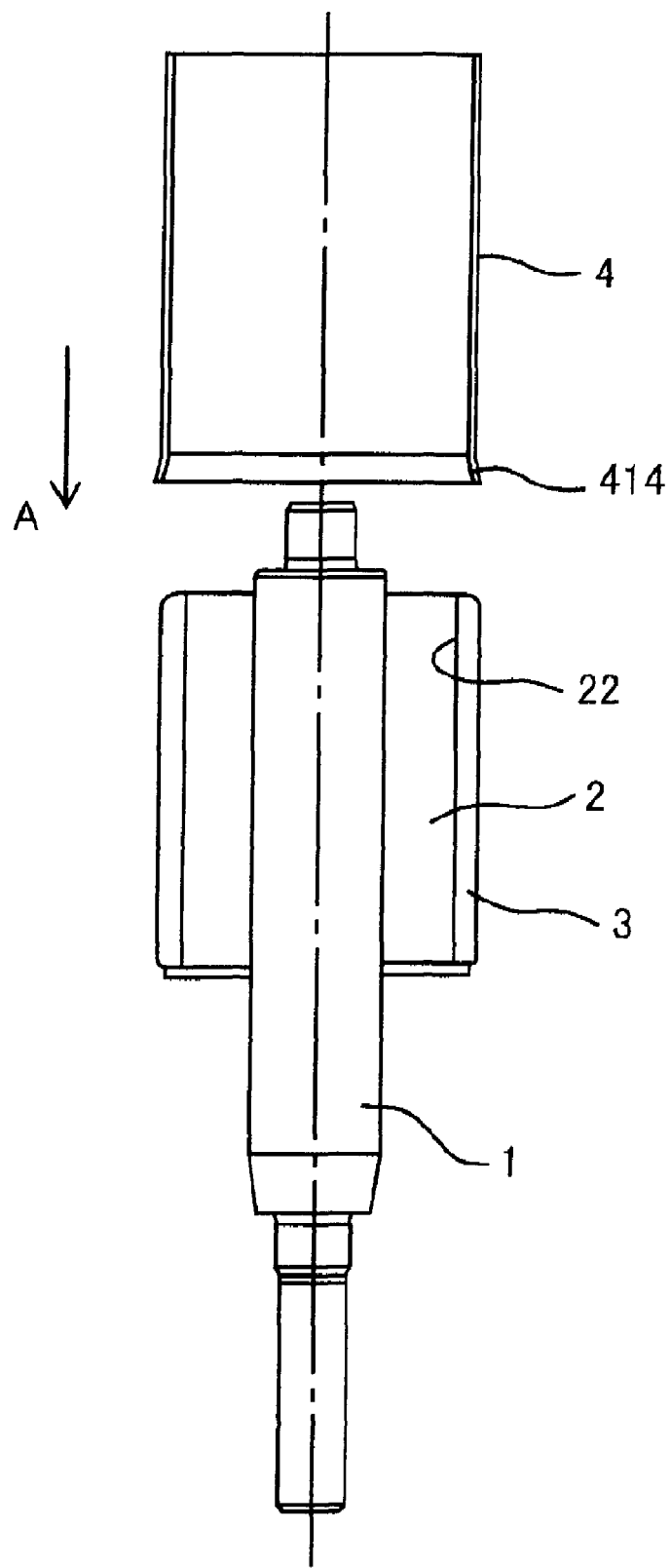
FIG. 16 is a set of explanatory views for explaining the manufacturing method, for a rotor of a rotating electrical machine, according to Embodiment 9 of the present invention.

Next, a manufacturing method for a rotor of a rotating electrical machine, according to Embodiment 9 of the present invention, will be explained. In the following explanation, a case will be explained in which the rotor of a rotating electrical machine, illustrated in FIGS. 1 to 3, according to Embodiment 1 is manufactured. FIGS. 15 and 16 are explanatory views for explaining a manufacturing method, for the rotor of a rotating electrical machine, according to Embodiment 9 of the present invention. In the first place, a creation method for the non-magnetic ring 4 will be explained. The flat plate 411, illustrated in FIG. 15(a), of stainless steel which is the non-magnetic material is created. The flat plate 411 has a shape of a rectangle whose longitudinal side has the same length as the circumferential-direction length of the non-magnetic ring 4 to be manufactured and whose transverse side has the same length as the axis-direction length of the non-magnetic ring 4 to be manufactured.

Next, as illustrated in FIG. 15(b), the stainless-steel flat plate 411 created as described above is bent in the longitudinal-side direction to be formed in such a way as to be the non-magnetic ring. In this situation, the flat plate 411 is bent to be formed in such a way as to be a polygon having the inner-diameter bulging portion 41 the number of which is the same as that of the magnetic poles 3 placed on the rotor iron core 2. After that, both the end surfaces of the bent flat plate 411 are made to abut on each other and bonded through TIG welding, so that the creation of the non-magnetic ring 4 is completed. In addition, it goes without saying that a bonding portion 412 where both the end surfaces of the flat plate 411 are bonded may be formed through laser welding, ultrasonic welding, or the like.

As described above, the non-magnetic ring 4 is produced by bending the flat plate 411, so that the yield rate of the material becomes high, compared with the manufacturing method such as deep drawing through press machining or the like. Moreover, it is made possible to form the non-magnetic ring 4 with a small-thickness or even-thickness material; thus, the non-magnetic ring 4 can be manufactured at low cost, compared with the case where a material having a shape of the non-magnetic ring is cut out by a predetermined length.

Next, as illustrates in FIG. 16, an introduction portion 414 whose diameter gradually increases along the axis direction is formed at one axis-direction end portion of the non-magnetic ring 4 created as described above. The bottom surfaces of the magnet poles 3 formed of a permanent magnet are adhered, by use of an adhesive, to the magnetic-pole fixing portions 22 provided on the outer circumferential surface of the rotor iron core 2. In addition, instead of adhering the magnetic poles 3 to the magnetic-pole fixing portion 22, the magnetic poles 3 placed on the magnetic-pole fixing portions 22 may be held by utilizing some sort of jig.

Next, the non-magnetic ring 4 is moved, in the direction indicated by the arrow A in FIG. 5, i.e., toward the rotor iron core 2; a plurality of the magnetic poles 3 are inserted into the non-magnetic ring 4 through the introduction portion 414; and then the non-magnetic ring 4 is mounted on the outer circumferential surface of the plurality of the magnetic poles 3. In this situation, the magnetic poles 3 are inserted into the non-magnetic ring 4 in such a way that the outer circumferential surfaces of the magnetic poles 3 make contact with the inner circumferential surfaces of the inner-diameter bulging portions 41 of the non-magnetic ring 4. Because the introduction portion 414 has been formed in the non-magnetic ring 4, the non-magnetic ring 4 is readily mounted on the outer circumferential surfaces of the magnetic poles 3.

Next, when the non-magnetic ring 4 is mounted on the plurality of the magnetic poles 3 approximately up to a predetermined position thereof, both the axis-direction end portions of the non-magnetic ring 4 are bent, as illustrates in FIG. 2, inward in the radial direction of the non-magnetic ring 4 so as to form the radial-direction extending portions 43 and 44 that extend in the radial direction; the radial-direction extending portion 43 is made to abut on the end plate 21 at one axis-direction end portion of the rotor iron core 2, and the radial-direction extending portion 44 is made to abut on the other axis-direction end surface of the rotor iron core 2. In such a manner as described above, the rotor of a rotating electrical machine, illustrated in FIGS. 1 to 3, according to Embodiment 1 is manufactured.

In the foregoing rotor manufacturing method according to Embodiment 9 of the present invention, the plurality of the magnetic poles 3 can securely be fixed at predetermined positions in the rotor by means of the non-magnetic ring 4; therefore, an rotating electrical machine can readily be manufactured in which neither deterioration nor fluctuation in the cogging torque is caused and that causes neither physical enlargement nor cost increase.

Embodiment 10

Next, a manufacturing method for a rotor of a rotating electrical machine, according to Embodiment 10 of the present invention, will be explained. In the case of Embodiment 9 described above, the inner-diameter bulging portions 41 the number of which is the same as that of the magnetic poles are preliminarily formed in the non-magnetic ring 4, and then the non-magnetic ring 4 is mounted on the plurality of the magnetic poles 3; however, in Embodiment 10 described below, the non-magnetic ring 4 is preliminarily formed to be circular-tube, and that non-magnetic ring 4 is deformed by being press-fitted on the outer circumferential surfaces of the plurality of the magnetic poles 3 mounted on the rotor iron core 2, so that the non-magnetic ring 4 is formed in which the inner-diameter bulging portions 41 the number of which is the same as that of the magnetic poles are included.

In the following explanation, a case will be explained in which the rotor of a rotating electrical machine, illustrated in FIGS. 1 to 3, according to Embodiment 1 is manufactured. In the first place, the non-magnetic flat plate 411 illustrated in FIG. 15(a) is longitudinally bent in such a way as to be approximately circular, so that the circular-tube non-magnetic ring 4 (unillustrated) is formed. The method, in which both the end surfaces of the flat plate 411 that has been bent in a circular-tube manner are made to abut on each other, and the method, in which the introduction portion 414 is formed at one axis-direction end portion of the non-magnetic ring 4, are the same as the manufacturing method according to Embodiment 9.

Next, the circular-tube non-magnetic ring 4 formed in the foregoing manner is moved toward the rotor iron core 2 and press-fitted, from the introduction portion 414, on the outer circumferential surfaces of the plurality of the magnetic poles 3. At this time, the non-magnetic ring 4 is deformed by the inner circumferential surface thereof being pressed against the outer circumferential surfaces of the plurality of the magnetic poles 3, so that the polygon-shaped non-magnetic ring 4 is inevitably formed in which the inner-diameter bulging portions 41 the number of which is the same as that of the plurality of the magnetic poles 3 are provided.

The method, in which the radial-direction extending portions 43 and 44 are formed at both the axis-direction end portions of the non-magnetic ring 4 that has been press-fitted and then the radial-direction extending portions 43 and 44 are made to abut on the end plate 21 and the axis-direction end surface of the rotor iron core 2, respectively, that are provided at the corresponding axis-direction end portions of the rotor iron core 2, is the same as the manufacturing method according to Embodiment 9 described above. In such a manner as described above, the rotor of a rotating electrical machine, illustrated in FIGS. 1 to 3, according to Embodiment 1 is manufactured.

In the foregoing rotor manufacturing method according to Embodiment 10 of the present invention, it is only necessary to form the nonmagnetic ring 4 which has not been press-fitted to be circular-tube but not to be polygon-shaped; therefore, the non-magnetic ring 4 is readily manufactured. Moreover, by being press-fitted, the inner circumferential surface of the non-magnetic ring 4 abuts on the plurality of the magnetic poles 3, so that inner-diameter bulging portions 41 are formed; therefore, it is not required that, as is the case with Embodiment 9 in which the inner-diameter bulging portions 41 are preliminarily formed in the non-magnetic ring 4, the magnetic poles 3 are inserted into the non-magnetic ring 4 in such a way that the positions of the inner-diameter bulging portion 41 and the outer circumferential surface of the magnetic pole 3 coincide with each other; thus, the circumferential positioning upon the press-fitting of the non-magnetic ring 4 is not required.

Still moreover, because, while being press-fitted, the non-magnetic ring 4 extends in the circumferential direction, variations in the outer diameter of the rotor including the outer circumferential surface of the magnetic pole 3 and in the inner diameter of the non-magnetic ring 4 can be absorbed.

Embodiment 11

Next, a manufacturing method according to Embodiment 11 of the present invention will be explained. In the case of Embodiment 10 described above, circular-tube non-magnetic ring 4 is press-fitted on the outer circumferential surfaces of the plurality of the magnetic poles 3; however, in Embodiment 11, the non-magnetic ring 4 is preliminarily formed to be circular-tube, and that non-magnetic ring 4 is deformed by being shrinkage-fitted on the outer circumferential surfaces of the plurality of the magnetic poles 3 mounted on the rotor iron core 2, so that the non-magnetic ring 4 is formed in which the inner-diameter bulging portions 41 the number of which is the same as that of the magnetic poles are included.

In the following explanation, a case will be explained in which the rotor of a rotating electrical machine, illustrated in FIGS. 1 to 3, according to Embodiment 1 is manufactured. In the first place, as is the case with the manufacturing method according to Embodiment 10, the non-magnetic ring 4 is preliminarily formed to be circular-tube. In addition, the introduction portion 414 whose diameter gradually increases along the axis direction is formed at one axis-direction end portion of the non-magnetic ring 4 created as described above.

Next, after being heated to thermally expand, the non-magnetic ring 4 is moved toward the rotor iron core 2 and shrinkage-fitted, from the introduction portion 414, on the outer circumferential surfaces of the plurality of the magnetic poles 3.

After that, the shrinkage-fitted non-magnetic ring 4 is cooled to contract and the inner circumferential surface thereof is pressed against the outer circumferential surfaces of the plurality of the magnetic poles 3. At this time, the non-magnetic ring 4 is deformed, so that the polygon-shaped non-magnetic ring 4 is inevitably formed in which the inner-diameter bulging portions 41 the number of which is the same as that of the plurality of the magnetic poles 3 are provided.

The method, in which the radial-direction extending portions 43 and 44 are formed at both the axis-direction end portions of the non-magnetic ring 4 that has been shrinkage-fitted and then the radial-direction extending portions 43 and 44 are made to abut on the end plate 21 and the axis-direction end surface of the rotor iron core 2, respectively, that are provided at the corresponding axis-direction end portions of the rotor iron core 2, is the same as the manufacturing method according to Embodiment 9 or Embodiment 10 described above. In such a manner as described above, the rotor of a rotating electrical machine, illustrated in FIGS. 1 to 3, according to Embodiment 1 is manufactured.

In the foregoing, rotor manufacturing method according to Embodiment 11 of the present invention, by utilizing the thermal expansion of the non-magnetic ring 4, not only the non-magnetic ring 4 can readily be mounted on the outer circumferential surfaces of the magnetic poles 3, but also it is only necessary to form the non-magnetic ring 4 so as to be circular-tube; therefore, the non-magnetic ring 4 is readily manufactured. Moreover, it is not required that the positions of the magnetic pole 3 and the inner-diameter bulging portion 41 of the non-magnetic ring 4 coincide with each other; thus, the circumferential positioning upon the shrinkage-fitting of the non-magnetic ring 4 is not required. Furthermore, the thermal stress can increase biasing force exerted on the magnetic poles 3 in the direction that is oriented to the center of the rotor iron core 2.

Embodiment 12

Figure 17:
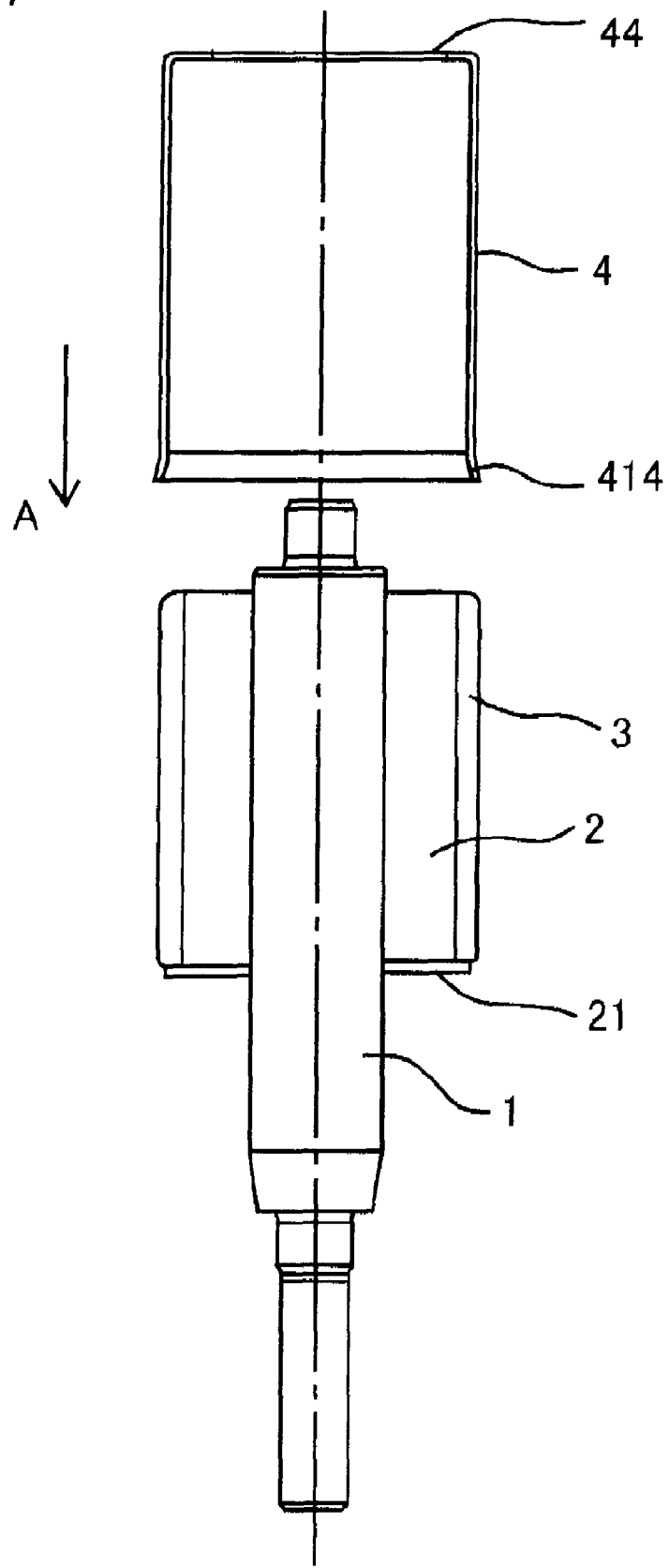
FIG. 17 is an explanatory views for explaining a manufacturing method, for a rotor of a rotating electrical machine, according to Embodiment 12 of the present invention.

Next, a manufacturing method for a rotor according to Embodiment 12 of the present invention will be explained. In the following explanation, a case will be explained in which the rotor of a rotating electrical machine, illustrated in FIGS. 1 to 3, according to Embodiment 1 is manufactured. FIG. 17 is an explanatory view for explaining a manufacturing method, for a rotor of a rotating electrical machine, according to Embodiment 12 of the present invention. In FIG. 17, in the first place, a flat plate made of a non-magnetic material is bent in the longitudinal-side direction so that the approximately circular-tube non-magnetic ring 4 is formed. The formation method is the same as that in Embodiment 10 or Embodiment 11.

Next, at one axial-direction end portion of the non-magnetic ring 4 that has been formed to be circular-tube, the radial-direction extending portion 44, which is bent to extend in the direction that is oriented to the center of a rotor iron core 2, is formed. Additionally, the introduction portion 414 is formed at the other axis-direction end portion of the non-magnetic ring 4. The introduction portion 414 may be formed at the same time when the radial-direction extending portion 44 is formed, or at another timing.

Next, the non-magnetic ring 4 formed in the foregoing manner is moved in the direction indicated by an arrow A in FIG. 17, i.e., toward the rotor iron core 2 on which a plurality of the magnetic poles 3 are mounted, and then press-fitted, from the introduction portion 414, on the outer circumferential surfaces of the plurality of the magnetic poles 3. At this time, the rotor iron core 2 is inserted into the non-magnetic ring 4 until the radial-direction extending portion 44 of the non-magnetic ring 4 abuts on the axis-direction end surface of the rotor iron core 2, so that the non-magnetic ring 4 is mounted on the outer circumferential surfaces of the plurality of the magnetic poles 3.

The non-magnetic ring 4 is deformed by the inner circumferential surface thereof being pressed against the outer circumferential surfaces of the plurality of the magnetic poles 3, so that the inner-diameter bulging portions 41 the number of which is the same as that of the plurality of the magnetic poles 3 is inevitably formed. After that, the radial-direction extending portion 43, illustrated in FIG. 2, is formed and made to abut on the end plate 21. In such a manner as described above, the rotor of a rotating electrical machine, illustrated in FIGS. 1 to 3, according to Embodiment 1 is manufactured.

In the foregoing rotor manufacturing method according to Embodiment 12 of the present invention, the radial-direction extending portion 44 is preliminarily formed at one axis-direction end portion of the non-magnetic ring 4; therefore, the axis-direction positioning of the non-magnetic ring 4 can be carried out by utilizing the radial-direction extending portion 44 as a reference. Moreover, by forming the radial-direction extending portion 44, the rigidity of the non-magnetic ring 4 is enhanced; when the non-magnetic ring 4 is press-fitted on the outer circumferential surfaces of the magnetic poles 3, the rotor iron core 2 is inserted into the non-magnetic ring 4 in such a way as to abut on the axis-direction end surface of the non-magnetic ring 4, whereby the non-magnetic ring 4 can be prevented from being pressurized to be deformed.

Embodiment 13

Figure 18:
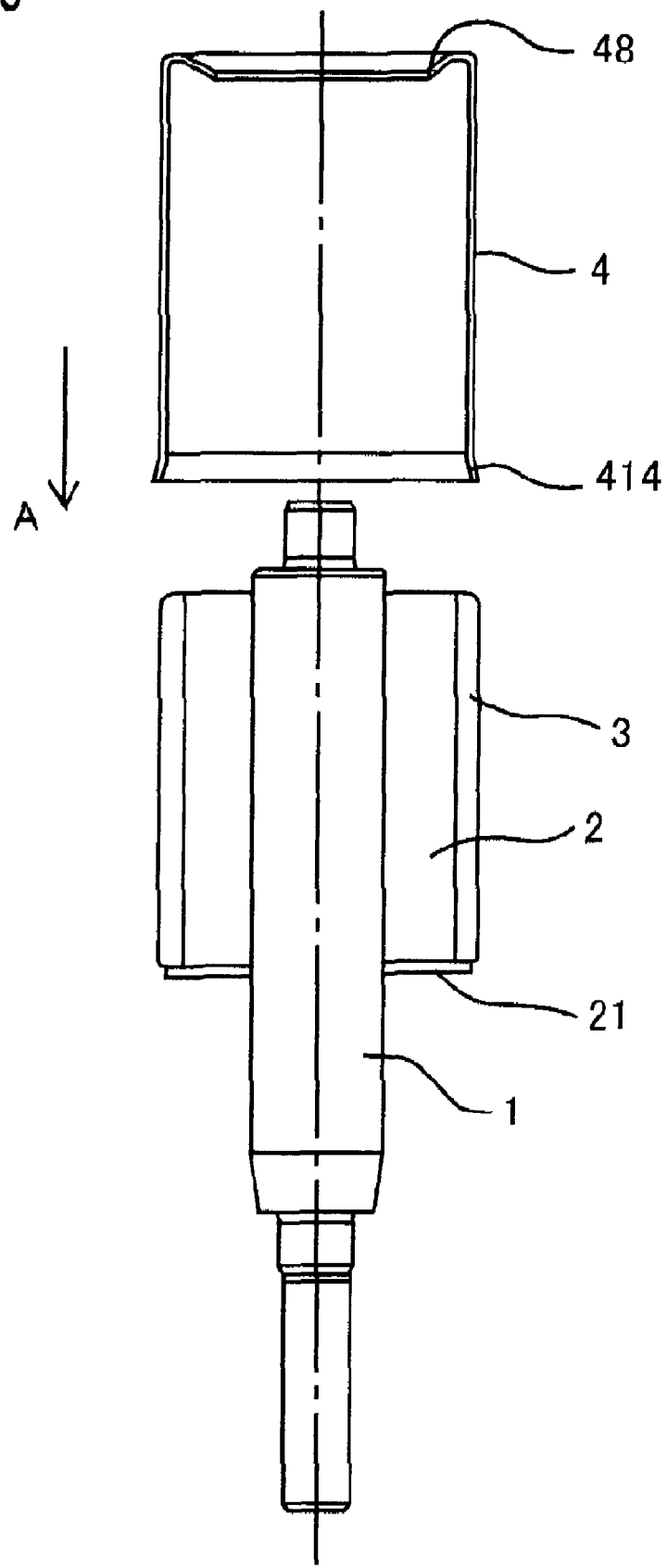
FIG. 18 is an explanatory views for explaining a manufacturing method, for a rotor of a rotating electrical machine, according to Embodiment 13 of the present invention.

Next, a rotor manufacturing method according to Embodiment 13 of the present invention will be explained. In the following explanation, a case will be explained in which the rotor of a rotating electrical machine, illustrated in FIGS. 1 to 3, according to Embodiment 1 is manufactured. FIG. 18 is an explanatory view for explaining a manufacturing method, for a rotor of a rotating electrical machine, according to Embodiment 13 of the present invention. In FIG. 18, in the first place, as is the case with Embodiments 10 to 12 described above, the flat plate 411 made of a non-magnetic material is bent in the longitudinal-side direction so that it is formed to be approximately circular-tube.

Next, at one axial-direction end portion of the non-magnetic ring 4 that has been formed to be circular-tube, a radial-direction extending portion 48, which is bent to extend in the direction that is oriented to the center of a rotor iron core 2, is formed. The radial-direction extending portion 48 is formed by being bent at an angle, from the outer circumferential surface of the non-magnetic ring 4, which is larger than 90°. Additionally, the introduction portion 414 is formed at the other axis-direction end portion of the non-magnetic ring 4. The introduction portion 414 may be formed at the same time when the radial-direction extending portion 48 is formed, or at another timing.

Next, the non-magnetic ring 4 formed in the foregoing manner is moved in the direction indicated by an arrow A in FIG. 18, i.e., toward the rotor iron core 2 on which a plurality of the magnetic poles 3 are mounted, and then press-fitted, from the introduction portion 414, on the outer circumferential surfaces of the plurality of the magnetic poles 3. At this time, the rotor iron core 2 is inserted into the non-magnetic ring 4 until the radial-direction extending portion 48 of the non-magnetic ring 4 abuts on the axis-direction end surface of the rotor iron core 2 and the bending angle of the radial-direction extending portion 48 becomes approximately 90° from outer circumferential surface of the non-magnetic ring 4, so that the non-magnetic ring 4 is mounted on the outer circumferential surfaces of the plurality of the magnetic poles 3.

The non-magnetic ring 4 is deformed by the inner circumferential surface thereof being pressed against the outer circumferential surfaces of the plurality of the magnetic poles 3, so that the inner-diameter bulging portions 41 the number of which is the same as that of the plurality of the magnetic poles 3 is inevitably formed. After that, the radial-direction extending portion 43, illustrated in FIG. 2, is formed and made to abut on the end plate 21. In such a manner as described above, the rotor of a rotating electrical machine, illustrated in FIGS. 1 to 3, according to Embodiment 1 is manufactured.

In the foregoing rotor manufacturing method according to Embodiment 13 of the present invention, the radial-direction extending portion 48 is preliminarily formed, at one axis-direction end portion of the non-magnetic ring 4, by being bent at an angle, from the outer circumferential surface of the non-magnetic ring 4, which is larger than 90°; therefore, the axis-direction positioning of the non-magnetic ring 4 can be carried out by utilizing the radial-direction extending portion 48 as a reference, and by, after the insertion of the rotor iron core 2, forming the radial-direction extending portion 43 at the other axis-direction end portion of the non-magnetic ring 4, the radial-direction extending portion 48 exerts biasing force on the non-magnetic ring 4 in the axis-direction, whereby the positional deviation of the non-magnetic ring 4 can be suppressed.

Moreover, by forming the radial-direction extending portion 48, the rigidity of the non-magnetic ring 4 is enhanced; when the non-magnetic ring 4 is press-fitted on the outer circumferential surfaces of the magnetic poles 3, the rotor iron core 2 is inserted into the non-magnetic ring 4 in such a way as to abut on the axis-direction end surface of the non-magnetic ring 4, whereby the non-magnetic ring 4 can be prevented from being pressurized to be deformed.

Variant Examples of Embodiments 9 to 13

In addition, with regard to the rotor of a rotating electrical machine manufacturing methods according to Embodiments 9 to 13 described above, a case has been described in which a rotor of a rotating electrical machine according to Embodiment 1 is manufactured; however, it goes without saying that the rotor of a rotating electrical machine manufacturing methods according to Embodiments 9 to 13 can also be applied to the manufacturing of the rotor of a rotating electrical machines according to Embodiments 2 to 8. However, the method of manufacturing the rotor, illustrated in FIGS. 11 and 12, according to Embodiment 6 is different from the foregoing manufacturing methods, in that both the end portions of the non-magnetic ring, which is formed by bending a flat plate, are overlapped on top of the other and bonded with each other. In addition, in the case where the rotor, illustrated in FIG. 13, according to Embodiment 7 is manufactured, the process of forming the axis-direction extending portion 45 is added to the foregoing processes; in the case where the rotor, illustrated in FIG. 14, according to Embodiment 8 is manufactured, the process of forming the axis-direction extending portions 46 and 47 is added to the foregoing processes.

Various modifications and alterations of this invention will be apparent to those skilled in the art without departing from the scope and spirit of this invention, and it should be understood that this is not limited to the illustrative embodiments set forth herein.

What is claimed is:

1. A rotor of a rotating electrical machine comprising a plurality of magnetic poles that are fixed on a rotor iron core and arranged spaced apart from one another in the circumferential direction of the rotor iron core, a tube-shaped non-magnetic ring mounted on outer circumferential surfaces of the plurality of magnetic poles, wherein the non-magnetic ring has a plurality of inner-diameter bulging portions that abut on the corresponding outer circumferential surfaces of the plurality of magnetic poles, and wherein the non-magnetic ring includes a radial-direction extending portion, at least one of the axis-direction end portions thereof, extending inward in the radial direction of the non-magnetic ring; and an axis-direction extending portion extending along the axis direction of the non-magnetic ring, from the radial-direction inner end portion of the radial-direction extending portion.

2. The rotor of a rotating electrical machine according to claim 1, wherein the non-magnetic ring is provided with an inner-circumferential shape that, in at least part thereof, includes an inner circumferential surface existing at a position that coincides with the tangential line on the outer circumferences of the magnetic poles that are adjacent to each other, or at a position that falls inside the tangential line, in the radial direction of the rotor.

3. The rotor of a rotating electrical machine according to claim 1, wherein the radial-direction extending portion is formed by being bent at an angle, from the outer circumferential surface of the non-magnetic ring, which is larger than 90°.

4. The rotor of a rotating electrical machine according to claim 1, wherein the non-magnetic ring is formed of aluminum.

5. The rotor of a rotating electrical machine according to claim 1, wherein the plurality of magnetic poles are arranged spaced approximately evenly apart from one another in the circumferential direction of the rotor iron core.

6. The rotor of a rotating electrical machine according to claim 1, wherein the rotor iron core is provided with positioning mechanisms that decide circumferential-direction positions of the plurality of magnetic poles, and
wherein the positioning mechanisms are formed of protrusion portions that are formed integrally with the rotor iron core and extend in the axis-direction of the rotor iron core.

7. A rotor of a rotating electrical machine comprising a plurality of magnetic poles that are fixed on a rotor iron core and arranged spaced apart from one another in the circumferential direction of the rotor iron core, a tube-shaped non-magnetic ring mounted on outer circumferential surfaces of the plurality of magnetic poles,
wherein the non-magnetic ring has a plurality of inner-diameter bulging portions that abut on the corresponding outer circumferential surfaces of the plurality of magnetic poles, and
wherein the non-magnetic ring is provided with large-diameter portions, in the vicinity of at least one of the axis-direction end portions thereof, which are formed in such a way that the contour sizes thereof are larger than those of other portions.

8. The rotor of a rotating electrical machine according to claim 1, wherein the non-magnetic ring is formed of stainless steel.

9. A rotor of a rotating electrical machine comprising a plurality of magnetic poles that are fixed on a rotor iron core and arranged spaced apart from one another in the circumferential direction of the rotor iron core, a tube-shaped non-magnetic ring mounted on outer circumferential surfaces of the plurality of magnetic poles,
wherein the non-magnetic ring has a plurality of inner-diameter bulging portions that abut on the corresponding outer circumferential surfaces of the plurality of magnetic poles,
wherein the rotor iron core is provided with positioning mechanisms that decide circumferential-direction positions of the plurality of magnetic poles,
wherein the positioning mechanisms include non-magnetic protrusion members that are fixed on the outer circumferential surface of the rotor iron core and extend in the axis-direction of the rotor iron core, and
wherein the positioning mechanism are each arranged spaced apart from one another in the axis-direction of the rotor iron core.

10. The rotor of a rotating electrical machine according to claim 1, wherein the axis-direction lengths of the plurality of magnetic poles are each set to be shorter than the axis-direction length of a magnetic-pole fixing portion provided in the rotor iron core.

11. The rotor of a rotating electrical machine according to claim 1, wherein the non-magnetic ring is formed by bending a flat-plate material and bonding both the end portions thereof, and the bonded portion is disposed at a position corresponding to a gap between the magnetic poles.

* * * * *